(12) United States Patent
Kim et al.

(10) Patent No.: US 11,513,566 B2
(45) Date of Patent: Nov. 29, 2022

(54) ELECTRONIC DEVICE INCLUDING HAPTIC ACTUATOR

(71) Applicant: Samsung Electronics Co., Ltd., Gyeonggi-do (KR)

(72) Inventors: Minsoo Kim, Gyeonggi-do (KR); Bongsub Kim, Gyeonggi-do (KR); Taewon Kim, Gyeonggi-do (KR); Sangmin Lee, Gyeonggi-do (KR); Jongheon Lee, Gyeonggi-do (KR); Jiwoo Lee, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 29 days.

(21) Appl. No.: 16/804,165

(22) Filed: Feb. 28, 2020

(65) Prior Publication Data

US 2020/0293093 A1 Sep. 17, 2020

(30) Foreign Application Priority Data

Mar. 14, 2019 (KR) .......................... 10-2019-0029272

(51) Int. Cl.
*G06F 1/16* (2006.01)

(52) U.S. Cl.
CPC .......... *G06F 1/1677* (2013.01); *G06F 1/1616* (2013.01); *G06F 1/1652* (2013.01); *G06F 1/1656* (2013.01); *G06F 1/1681* (2013.01)

(58) Field of Classification Search
CPC .... G06F 1/1677; G06F 1/1616; G06F 1/1656; G06F 1/1652; G06F 1/1681
See application file for complete search history.

(56) References Cited

U.S. PATENT DOCUMENTS 9,524,030 B2 * 12/2016 Modarres ............ H04M 1/0268
9,829,924 B2 * 11/2017 Shin .................... H04M 1/0268
(Continued)

FOREIGN PATENT DOCUMENTS

EP        2 796 976 A1   10/2014
JP   WO 2012/111793 A1    8/2012
(Continued)

OTHER PUBLICATIONS

International Search Report dated Jun. 11, 2020.
European Search Report dated Dec. 21, 2021.

*Primary Examiner* — Anthony M Haughton
*Assistant Examiner* — Theron S Milliser
(74) *Attorney, Agent, or Firm* — Cha & Reiter, LLC

(57) ABSTRACT

According to one aspect of the disclosure an electronic device comprises a foldable housing including: a hinge structure, a first housing structure connected to the hinge structure, and including a first face and a second face opposite the first face, and a second housing structure connected to the hinge structure and including a third face and a fourth face opposite the third face, the second housing structure being configured to be rotated about the hinge structure; a flexible display extending over the first face and over the third face; at least one sensor disposed within the foldable housing, and configured to sense an angle formed between the first face and the third face; a first haptic actuator disposed within the first housing structure; a second haptic actuator disposed within the second housing structure; at least one processor disposed within the first housing structure or the second housing structure, and operatively connected to the flexible display, the at least one sensor, the first haptic actuator, and the second haptic actuator. The at least one processor may detect a folding state of the foldable housing using the at least one sensor, and independently (Continued)

control the first haptic actuator and the second haptic actuator based on at least part of the detected folding state.

17 Claims, 20 Drawing Sheets

(56) References Cited

U.S. PATENT DOCUMENTS

| | | | | |
|---|---|---|---|---|
| 9,992,888 | B2* | 6/2018 | Moon | G06F 1/1618 |
| 10,048,758 | B2* | 8/2018 | Modarres | G06F 1/1641 |
| 10,133,310 | B2* | 11/2018 | Kim | G06F 1/1652 |
| 10,346,117 | B2* | 7/2019 | Sylvan | G06F 3/1423 |
| 10,433,438 | B2* | 10/2019 | Moon | H05K 5/0086 |
| 10,606,540 | B2* | 3/2020 | Sylvan | G06F 1/1681 |
| 10,945,346 | B2* | 3/2021 | Moon | G06F 1/1652 |
| 2006/0119573 | A1 | 6/2006 | Grant et al. | |
| 2010/0056223 | A1 | 3/2010 | Choi et al. | |
| 2010/0073304 | A1 | 3/2010 | Grant et al. | |
| 2013/0010405 | A1* | 1/2013 | Rothkopf | H05K 5/0226 361/679.01 |
| 2013/0325386 | A1 | 12/2013 | Takano | |
| 2014/0210740 | A1* | 7/2014 | Lee | G06F 1/1618 345/173 |
| 2014/0320393 | A1* | 10/2014 | Modarres | G06F 3/017 345/156 |
| 2015/0366089 | A1* | 12/2015 | Park | G06F 1/1641 361/679.01 |
| 2016/0070304 | A1* | 3/2016 | Shin | G06F 1/1652 361/679.26 |
| 2016/0132074 | A1* | 5/2016 | Kim | G06F 1/1652 715/769 |
| 2017/0060248 | A1* | 3/2017 | Modarres | G06F 3/016 |
| 2017/0083092 | A1 | 3/2017 | Levesque et al. | |
| 2017/0329408 | A1 | 11/2017 | Harris | |
| 2018/0077810 | A1* | 3/2018 | Moon | G06F 1/1681 |
| 2018/0129459 | A1* | 5/2018 | Sylvan | G06F 3/167 |
| 2018/0143689 | A1 | 5/2018 | Heubel et al. | |
| 2018/0224941 | A1 | 8/2018 | Modarres et al. | |
| 2019/0073035 | A1* | 3/2019 | Modarres | G06F 3/017 |
| 2019/0332343 | A1* | 10/2019 | Sylvan | G06F 1/1681 |
| 2020/0383219 | A1* | 12/2020 | Hale | E05D 3/18 |

FOREIGN PATENT DOCUMENTS

| | | |
|---|---|---|
| JP | 2017-073823 A | 4/2017 |
| KR | 10-2010-0027501 A | 3/2010 |
| KR | 10-2013-0066721 A | 6/2013 |
| KR | 10-2017-0034340 A | 3/2017 |
| WO | 2010/036641 A1 | 4/2010 |

* cited by examiner

ELECTRONIC DEVICE INCLUDING HAPTIC ACTUATOR

CROSS-REFERENCE TO RELATED APPLICATION(S)

This application is based on and claims priority under 35 U.S.C. 119 to Korean Patent Application No. 10-2019-0029272, filed on Mar. 14, 2019, in the Korean Intellectual Property Office, the disclosure of which is herein incorporated by reference in its entirety.

TECHNICAL FIELD

Certain embodiments relate to an electronic device including a haptic actuator.

BACKGROUND

Due to the rapid development of information communication technology and semiconductor technology, the distribution and use of various electronic devices are dramatically increasing. In particular, recent electronic devices are being developed such that users can communicate with each other while carrying the electronic devices.

The above-mentioned electronic devices may output, for example, information stored therein as sound or an image. As the integration degree of electronic devices has increased and super-high speed and large-capacity wireless communication have become popular, various functions have recently been provided in a single electronic device, such as a mobile communication terminal. For example, various functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function. Such an electronic device has been miniaturized so that the user can conveniently carry the electronic device.

SUMMARY

According to one aspect an electronic device comprises a foldable housing including: a hinge structure, a first housing structure connected to the hinge structure, and including a first face and a second face opposite the first face, and a second housing structure connected to the hinge structure and including a third face and a fourth face opposite the third face, the second housing structure being configured to be rotated about the hinge structure; a flexible display extending over the first face and over the third face; at least one sensor disposed within the foldable housing, and configured to sense an angle formed between the first face and the third face; a first haptic actuator disposed within the first housing structure; a second haptic actuator disposed within the second housing structure; at least one processor disposed within the first housing structure or the second housing structure, and operatively connected to the flexible display, the at least one sensor, the first haptic actuator, and the second haptic actuator. The at least one processor may detect a folding state of the foldable housing using the at least one sensor, and independently control the first haptic actuator and the second haptic actuator based on at least part of the detected folding state.

An electronic device according to certain embodiments may include: a foldable housing including a hinge structure, a first housing structure connected to the hinge structure, and a second housing structure connected to the hinge structure, the second housing structure being configured to be rotatable about the hinge structure relative to the first housing structure; a flexible display disposed to extend from the first housing structure to the second housing structure; at least one sensor disposed within the foldable housing and configured to detect rotation of the second housing structure relative to the first housing structure; a first haptic actuator disposed within the first housing structure; a second haptic actuator disposed within the second housing structure; a processor disposed within the first housing structure or the second housing structure, and operatively connected to the display, the at least one sensor, the first haptic actuator, and the second haptic actuator; and a memory operatively connected to the processor.

According to an aspect of the disclosure an electronic device comprises a foldable housing including: a hinge structure, a first housing structure connected to the hinge structure, and including a first face and a second face opposite the first face, and a second housing structure connected to the hinge structure, and including a third face and a fourth face opposite the third face; a first display positioned on the first face; a second display positioned on the third face; at least one sensor disposed within the foldable housing, and configured to detect a folding state of the foldable housing; a first haptic actuator disposed within the first housing structure; a second haptic actuator disposed within the first housing structure; at least one processor disposed within the first housing structure or the second housing structure, and operatively connected to the display, the at least one sensor, the first haptic actuator, and the second haptic actuator; and a memory operatively connected to the processor, wherein the memory stores instructions that, when executed, cause the at least one processor to detect a folding state of the foldable housing using the at least one sensor, and to independently control the first haptic actuator and the second haptic actuator based on at least part of the detected folded state.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

As the mobile communication service is extended to the multimedia service area, the sizes of the displays of electronic devices may be increased so as to allow the users to fully utilize the multimedia service as well as a voice call or short message service. Thus, a foldable display may be placed over the entire area of the housing structures, which is separated to be foldable.

A foldable electronic device may include multiple housing structures, which are rotatable relative to each other. In general, a haptic actuator may be disposed in any one of the plurality of housing structures of the electronic device. It may be difficult to deliver effective haptic feedback across the entire face of the flexible display for a haptic actuator mounted in only one of the different housing structures that maintain different placement relationships due to rotation.

According to certain embodiments, a haptic actuator may be disposed in each of a plurality of housing structures disposed in a foldable electronic device.

According to certain embodiments, in a foldable electronic device, vibration phase control between dual haptic actuators may be provided. Accordingly, it is possible to provide improved haptic feedback to a user regardless of the folding position of the electronic device.

With an electronic device according to certain embodiments, a haptic actuator may be disposed in each of a first housing structure and a second housing structure constituting a foldable housing. Thus, it is possible to provide a device including dual haptic actuators.

With an electronic device according to certain embodiments, it is possible to provide improved haptic feedback to a user through vibration phase control between dual haptic actuators.

Figure 1:
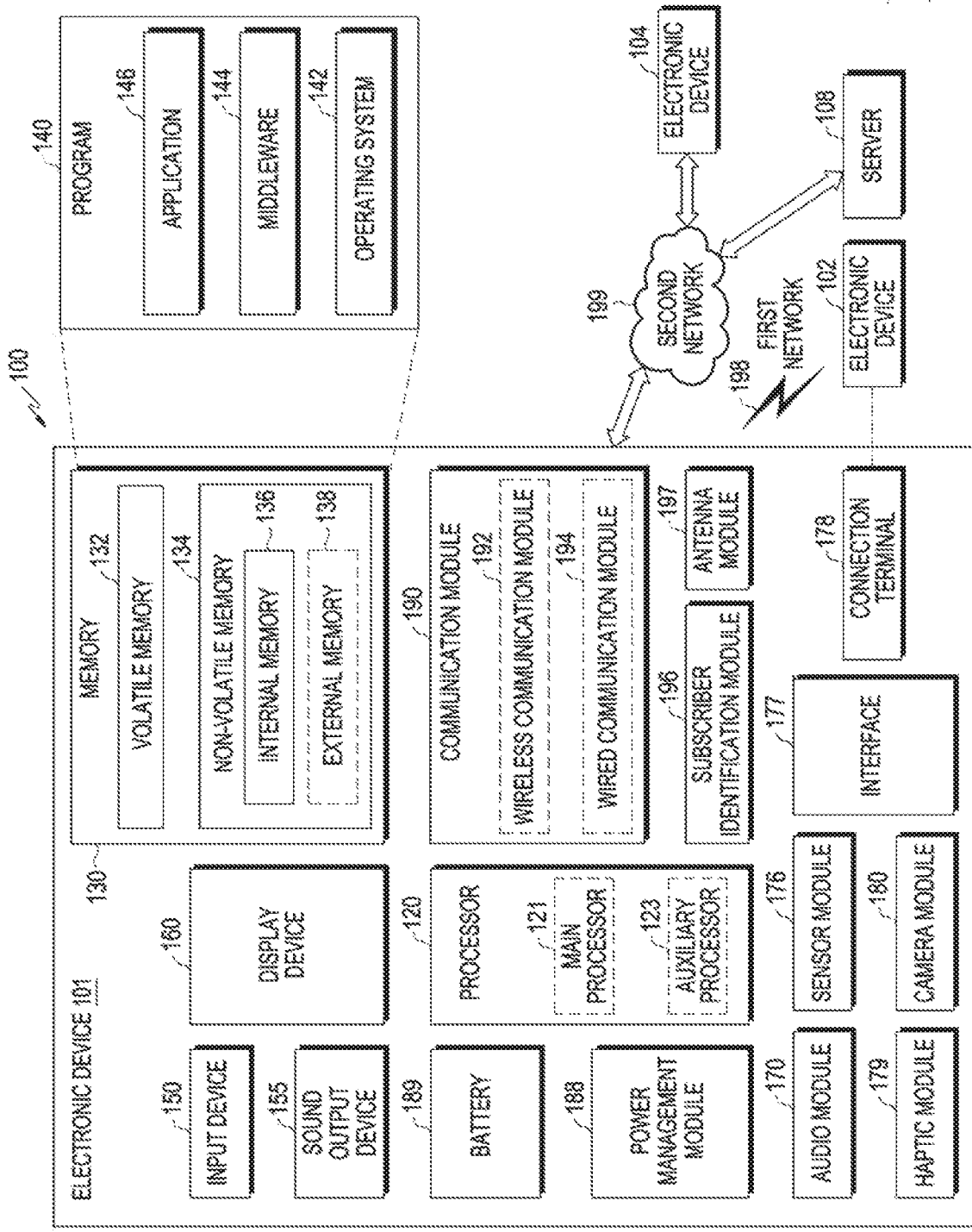
FIG. 1 is a block diagram of an electronic device according to certain embodiments in a network environment.

FIG. 1 is a block diagram illustrating an electronic device 101 in a network environment 100 according to certain embodiments. The term "electronic device" may mean a device that performs a specific function depending on a program incorporated therein, such as an electronic scheduler, a portable multimedia reproducer, a mobile communication terminal, a tablet PC, an image/sound device, a desktop PC, a laptop PC, or a vehicular navigation system, as well as a home appliance.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 may be disposed inside of a folding housing. The folding housing can include multiple housings interconnected by a hinge. The folding housing allows for the display to be bigger and improves the user experience. A haptic actuator is often used as feedback for touching of virtual keys. In certain embodiments, the electronic device 101 can include haptic actuator in each housing.

Figure 2:
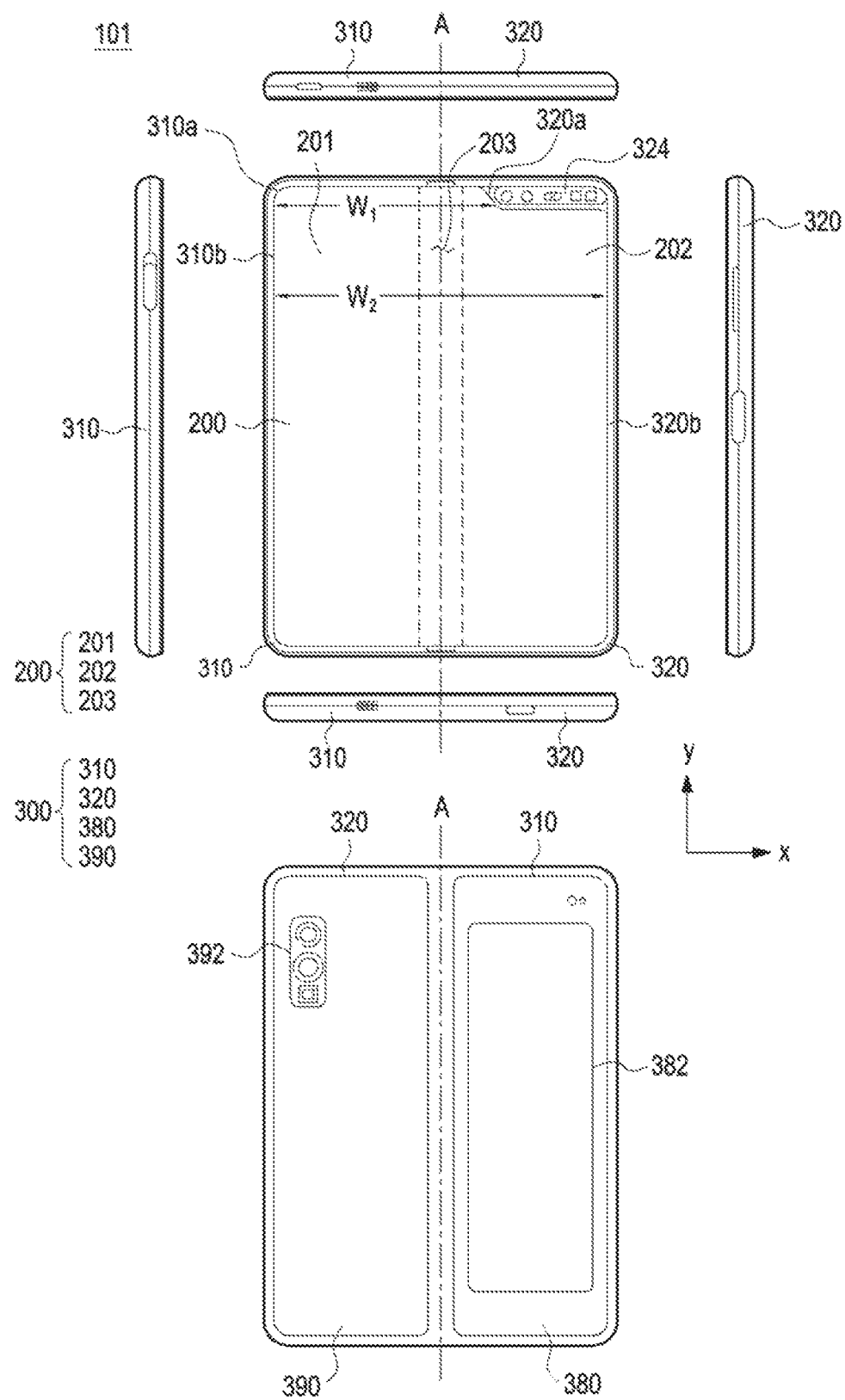
FIG. 2 is a view illustrating the state in which an electronic device according to certain embodiments is unfolded.
Figure 3:
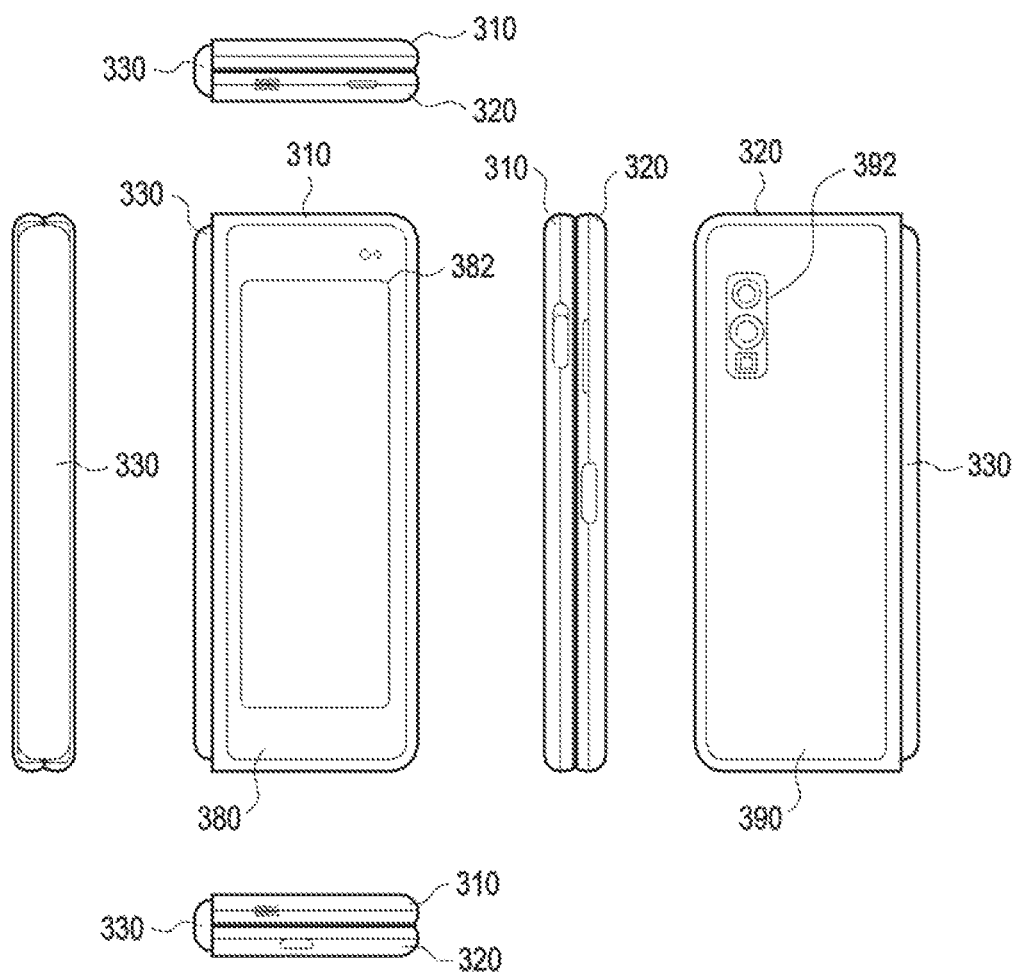
FIG. 3 is a view illustrating the state in which the electronic device according to certain embodiments is folded.

FIG. 2 is a view illustrating an electronic device according to certain embodiments that is unfolded. FIG. 3 is a view illustrating the electronic device according to certain embodiments that is folded.

Referring to FIGS. 2 and 3, in an embodiment, an electronic device 101 may include a foldable housing 300, a hinge cover (e.g. a hinge cover 330 in FIG. 3) configured to cover the foldable portion of the foldable housing 300, and a flexible or foldable display 200 (hereinafter, simply referred to as a "display" 200) (e.g., the display device 160 in FIG. 1) disposed in the space defined by the foldable housing 300. According to an embodiment, the face on which the display 200 is disposed is defined as the front face of the electronic device 101. The face opposite the front face is defined as the rear face of the electronic device 101. In addition, the face surrounding the space between the front face and the rear face is defined as the side face of the electronic device 101.

Figure 4:
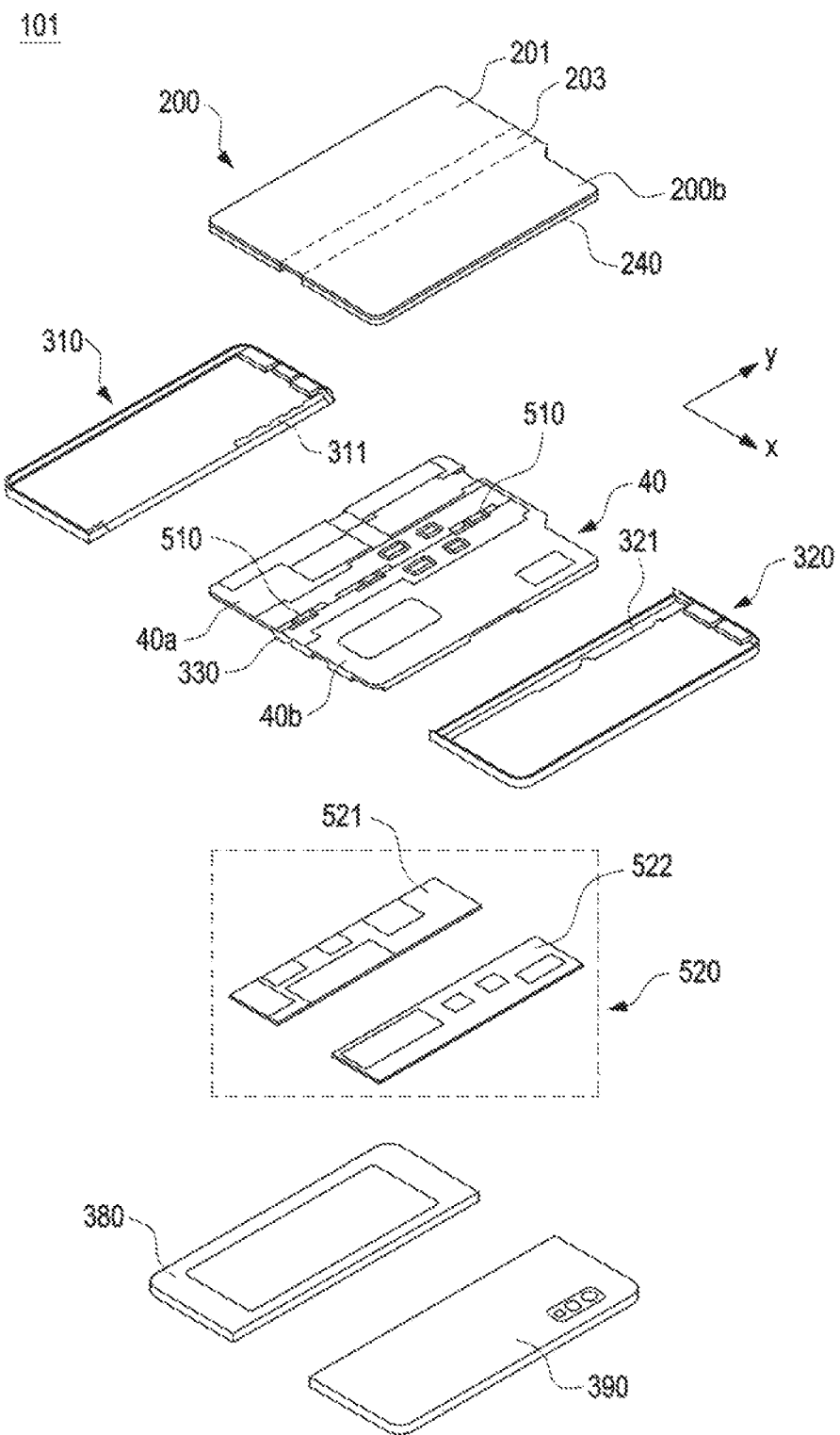
FIG. 4 is an exploded perspective view illustrating the electronic device according to certain embodiments.

According to certain embodiments, the foldable housing 300 may include a first housing structure 310, a second housing structure 320 including a sensor area 324, a first rear cover 380, a second rear cover 390, and a hinge structure (e.g., a hinge structure 510 in FIG. 4). The foldable housing 300 of the electronic device 101 is not limited to the shape and assembly illustrated in FIGS. 2 and 3, but may be implemented by other shapes or other combinations and/or assemblies of components. For example, in another embodiment, the first housing structure 310 and the first rear cover 380 may be integrally formed, and the second housing structure 320 and the second rear cover 390 may be integrally formed.

In certain embodiments, the folded state and the unfolded state are distinguished by the angle formed by the first housing structure 310 and second housing structure 320, or faces thereof. When the first housing structure 310 and the second housing structure 320 are substantially flat or within a threshold (in some embodiments 10 degrees) of flat or forming a 180 degree angle, the electronic device is considered in the unfolded state. When the deviation of the angle of the first housing structure 310 and the second housing structure 320 from flat or 180 degrees exceeds the threshold, the electronic device is considered to be in the folded state.

The threshold (within 150 degrees of 180 degree angle) can be set so that folded state only occurs when the electronic device is almost completely folded or just only slightly bent (within 10 degrees of a 180 degree angle).

According to certain embodiments, the first housing structure 310 may be connected to a hinge structure (e.g., a hinge structure 510 in FIG. 4) and may include a first face oriented in a first direction and a second face oriented in a second direction opposite the first direction. The second housing structure 320 may be connected to the hinge structure 510 and may include a third face oriented in a third direction and a fourth face oriented in a fourth direction opposite the third direction. The second housing structure 320 is rotatable about the hinge structure 510 relative to the first housing structure 310. Accordingly, the electronic device 101 may be deformable into the folded state or the unfolded state. In the folded state of the electronic device 101, the first face may face the third face, and in the unfolded state, the third direction may be the same as the first direction.

According to certain embodiments, the first housing structure 310 and the second housing structure 320 may be disposed on opposite sides about a folding axis A and may have a generally symmetrical shape with respect to the folding axis A. As will be described later, the first housing structure 310 and the second housing structure 320 have different angles or distances therebetween depending on whether the electronic device 101 is in the unfolded state, in the folded state, or in the intermediate state. According to an embodiment, unlike the first housing structure 310, the second housing structure 320 may further include the sensor area 324 in which various sensors are disposed. However, the first housing structure 310 and the second housing structure 320 may have mutually symmetrical shapes in other areas.

According to certain embodiments, as illustrated in FIG. 2, the first housing structure 310 and the second housing structure 320 may form a recess that accommodates the display 200 therein. According to an embodiment, due to the sensor area 324, the recess may have two or more different widths in a direction perpendicular to the folding axis A.

According to an embodiment, the recess may have a first width $w_1$ between a first portion 310a parallel to the folding axis A of the first housing structure 310 and a second portion 320a formed at an edge of the sensor area 324 of the second housing structure 320. The recess may have a second width $w_2$ formed by a second portion 310b of the first housing structure 310 and a second portion 320b of the second housing structure 320, which is parallel to the folding axis A while not corresponding to the sensor area 324. In this case, the second width $w_2$ may be longer than the first width $w_1$. As another example, the first portion 310a of the first housing structure 310 and the first portion 320a of the second housing structure 320, which are asymmetric to each other, may form the first width $w_1$ of the recess, and the second portion 310b of the first housing structure 310 and the second portion 320b of the second housing structure 320, which are symmetric to each other, may form the second width $w_2$ of the recess. According to an embodiment, the first portion 320a and the second portion 320b of the second housing structure 320 may have different distances from the folding axis A, respectively. The widths of the recess are not limited to the illustrated example. In another embodiment, the recess may have multiple widths due to the shape of the sensor area 324 or due to the asymmetric portions of the first housing structure 310 and the second housing structure 320.

According to certain embodiments, at least a portion of the first housing structure 310 and at least a portion of the second housing structure 320 may be formed of a metal material or a non-metallic material having the rigidity of a level selected to support the display 200. The at least a portion formed of the metal material may provide a ground plane of the electronic device 101 and may be electrically connected to a ground line formed on a printed circuit board (e.g., the board unit 520 in FIG. 4).

According to certain embodiments, the sensor area 324 may be formed to have a predetermined area adjacent to one corner of the second housing structure 320. However, the arrangement, shape, and size of the sensor area 324 are not limited to those in the illustrated example. For example, in another embodiment, the sensor area 324 may be provided at another corner of the second housing structure 320 or in any area between the upper and lower end corners. In an embodiment, components embedded in the electronic device 101 to perform various functions may be exposed to the front face of the electronic device 101 through the sensor area 324 or one or more openings provided in the sensor area 324. In certain embodiments, the components may include various types of sensors. The sensors may include at least one of, for example, a front camera, a receiver or a proximity sensor.

According to certain embodiments, the first rear cover 380 may be disposed on one side of the folding axis in the rear face of the electronic device 101, and may have, for example, a substantially rectangular periphery, and the periphery may be enclosed by the first housing structure 301. Similarly, the second rear cover 390 may be disposed on the other side of the folding axis of the rear face of the electronic device 101, and the periphery of the second rear cover 390 may be enclosed by the second housing structure 320.

According to certain embodiments, the first rear cover 380 and the second rear cover 390 may have substantially symmetrical shapes about the folding axis (the axis A). However, the first rear cover 380 and the second rear cover 390 do not necessarily have mutually symmetrical shapes, and in another embodiment, the electronic device 101 may include the first rear cover 380 and the second rear cover 390 having various shapes. In a still another embodiment, the first rear cover 380 may be formed integrally with the first housing structure 310, and the second rear cover 390 may be formed integrally with the second housing structure 320.

According to certain embodiments, the first rear cover 380, the second rear cover 390, the first housing structure 310, and the second housing structure 320 may define a space in which various components (e.g., a printed circuit board or a battery) of the electronic device 101 can be arranged. According to an embodiment, one or more components may be disposed or visually exposed on the rear face of the electronic device 101. For example, at least a portion of a sub-display may be visually exposed through a first rear area 382 of the first rear cover 380. In another embodiment, one or more components or sensors may be visually exposed through a second rear region 392 of the second rear cover 390. In certain embodiments, the sensors may include a proximity sensor and/or a rear camera.

According to certain embodiments, a front camera exposed to the front face of the electronic device 101 through the one or more openings provided in the sensor area 324 or a rear camera exposed through the second rear area 392 of the second rear cover 390 may include one or more lenses, an image sensor, and/or an image signal processor. The flash may include, for example, a light-emitting diode or a xenon lamp. In some embodiments, two or more lenses (e.g., an infrared camera lens, a wide-angle lens, and a telephoto lens) and image sensors may be disposed on one face of the electronic device 101.

Referring to FIG. 3, the hinge cover 330 may be disposed between the first housing structure 310 and the second housing structure 320 so as to cover internal components (e.g., the hinge structure 510 in FIG. 4). According to an embodiment, the hinge cover 330 may be covered by a portion of the first housing structure and a portion of the second housing structure 320, or may be exposed to the outside depending on the state of the electronic device 101 (the unfolded state, the intermediate state, or the folded state).

According to an embodiment, as illustrated in FIG. 2, when the electronic device 101 is in the unfolded state, the hinge cover 330 may be covered by the first housing structure 310 and the second housing structure 320 so as not be exposed. As another example, as illustrated in FIG. 3, when the electronic device 101 is in the folded state (e.g., the fully folded state), the hinge cover 330 may be exposed to the outside between the first housing structure 310 and the second housing structure 320. As still another example, when the first housing structure 310 and the second housing structure 320 are in the intermediate state in which the first housing structure 310 and the second housing structure 320 are folded to form a predetermined angle therebetween, a portion of the hinge cover 330 may be exposed to the outside between the first housing structure 310 and the second housing structure 320. In this case, however, the exposed area may be less than that in the fully folded state. In an embodiment, the hinge cover 330 may include a curved face. In certain embodiments, the intermediate state can be considered the folded state while in other embodiments, the intermediate state can be considered the unfolded state.

According to certain embodiments, the display 200 may be disposed on a space formed by the foldable housing 300. For example, the display 200 may be seated on the recess formed by the foldable housing 300 and may constitute most of the front face of the electronic device 101. Accordingly, the front face of the electronic device 101 may include the display 200 and a portion of the first housing structure 310 and a portion of the second housing structure 320, which are adjacent to the display 200. In addition, the rear face of the electronic device 101 may include the first rear cover 380, a portion of the first housing structure 310 adjacent to the first rear cover 380, the second rear cover 390, and a portion of the second housing structure 320 adjacent the second rear cover 390.

According to certain embodiments, the display 200 may refer to a display in which at least a portion is deformable into a planar face or a curved face. According to an embodiment, the display 200 may include a folding area 203, a first area 201 disposed on one side of the folding area 203 (e.g., the left side of the folding area 203 illustrated in FIG. 2) and a second area 202 disposed on the other side of the folding area 203 (e.g., the right side of the folding area 203 illustrated in FIG. 2).

However, the area division of the display 200 illustrated in FIG. 2 is exemplary, and the display 200 may be divided into multiple areas (e.g., four or more or two areas) depending on the structures or functions thereof. For example, in the embodiment illustrated in FIG. 2, the areas of the display 200 may be divided by the folding area 203 or the folding axis (the axis A) extending parallel to the y axis. However, in another embodiment, the areas of the display 200 may be divided on the basis of another folding area (e.g., a folding area parallel to the x axis) or another folding axis (e.g., a folding axis parallel to the x axis). According to an embodiment, the display 200 may be coupled to or disposed adjacent to a touch-sensing circuit, a pressure sensor that is capable of measuring touch intensity (pressure), and/or a digitizer that detects a magnetic field-type stylus pen.

According to certain embodiments, the first area 201 and the second area 202 may have generally symmetrical shapes about the folding area 203. However, unlike the first area 201, the second area 202 may include a notch cut due to the presence of the sensor area 324, but may have a symmetrical shape with the first area 201 in the area other than the sensor area. In other words, the first area 201 and the second area 202 may include portions having mutually symmetrical shapes and portions having mutually asymmetrical shapes.

Hereinafter, the operations of the first housing structure 310 and the second housing structure 320 according to the state of the electronic device 101 (e.g., the unfolded state, the folded state, or the intermediate state) and respective areas of the display 200 will be described.

According to certain embodiments, when the electronic device 101 is in the unfolded state (e.g., FIG. 2), the first housing structure 310 and the second housing structure 320 may be disposed to form an angle of 180 degrees therebetween and be oriented in the same direction. The surface of the first area 201 and the surface of the second area 202 of the display 200 form 180 degrees relative to each other, and may be oriented in the same direction (e.g., the front direction of the electronic device). The folding area 203 may form the same plane as the first area 201 and the second area 202.

According to certain embodiments, when the electronic device 101 is in the folded state (e.g., FIG. 3), the first housing structure 310 and the second housing structure 320 may be disposed to face each other. The surface of the first area 201 and the face of the second area 202 of the display 200 may face each other while forming a narrow angle (e.g., an angle between 0 and 10 degrees) relative to each other. At least a portion of the folding area 203 may be a curved face having a predetermined curvature.

According to certain embodiments, when the electronic device 101 is in the intermediate state, the first housing structure 310 and the second housing structure 320 may be disposed to form a predetermined angle relative to each other. The surface of the first area 201 and the surface of the second area 202 of the display 200 may form an angle larger than that in the folded state and smaller than that in the unfolded state. At least a portion of the folding area 203 may have a curved face having a predetermined curvature, and the curvature at this time may be smaller than that in the folded state.

FIG. 4 is an exploded perspective view illustrating an electronic device according to certain embodiments.

Referring to FIG. 4, in certain embodiments, the electronic device 101 may include a foldable housing, a display 200, and a board unit 520. The foldable housing may include a first housing structure 310, a second housing structure 320, a bracket assembly 40, a first rear cover 380, a second rear cover 390, and a hinge structure 510.

The display 200 can be a touchscreen display that outputs graphic information and receives user inputs. The foldable housing (including first housing structure 310, second housing structure 320, and hinge structure 510) forms the housing of the electronic device. The board unit 520 can, in certain embodiments, detect whether the electronic device is in a folded or unfolded state.

According to certain embodiments, the display 200 may include a display panel 200b (e.g., a flexible display panel), and at least one plate or layer (e.g., a support plate 240) on which the display panel 200 is seated. In an embodiment, the support plate 240 may be disposed between the display panel 200b and the bracket assembly 40. An adhesive structure (not illustrated) may be located between the support plate 240 and the bracket assembly 40 and may bond the support plate 240 to the bracket assembly 40.

According to certain embodiments, the bracket assembly 40 may include a first bracket assembly 40a and a second bracket assembly 40b. Between the bracket assembly 40a and the second bracket assembly 40b, a hinge structure 510 is disposed and a hinge cover 330, which covers the hinge structure 510 when the hinge structure 510 is viewed from the outside, may be disposed. As another example, a printed circuit board (e.g., a flexible printed circuit board (FPC)) may be disposed across the first bracket assembly 40a and the second bracket assembly 40b.

According to certain embodiments, the board unit 520 may include a first main circuit board 521 disposed on the first bracket assembly 40a side and a second main circuit board 522 disposed on the second bracket assembly 40b side. The first main circuit board 521 and the second main circuit board 522 may be disposed in a space defined by the bracket assembly 40, the first housing structure 310, the second housing structure 320, the first rear cover 380, and the second rear cover 390. Components for implementing various functions of the electronic device 101 may be mounted on the first main circuit board 521 and the second main circuit board 522.

According to certain embodiments, the first housing structure 310 and the second housing structure 320 may be assembled so as to be coupled to the opposite sides of the bracket assembly 40 in the state in which the display 200 is coupled to the bracket assembly 40. For example, the first housing structure 310 and the second housing structure 320 may be coupled to the bracket assembly 40 by sliding on the opposite sides of the bracket assembly 40.

According to an embodiment, the first housing structure 310 may include a first rotational support face 311, and the second housing structure 220 may include a second rotational support face 321, which corresponds to the first rotational support structure 311. The first rotational support face 311 and the second rotational support face 321 may include curved faces corresponding to curved faces included in the hinge cover 330.

According to an embodiment, when the electronic device 101 is in the unfolded state (e.g., the electronic device in FIG. 2), the first rotational support face 311 and the second rotational support face 321 may cover the hinge cover 330 so that the hinge cover 330 may not be exposed to the rear face of the electronic device 101 or may be exposed to the rear face of the electronic device 101 to a minimum. As still another embodiment, when the electronic device 101 is in the folded state (e.g., the electronic device in FIG. 3), the first rotational support face 311 and the second rotational support face 321 may rotate along the curved faces included in the hinge cover 330 so that the hinge cover 330 may be exposed to the rear face of the electronic device 101 as much as possible.

Figure 5:
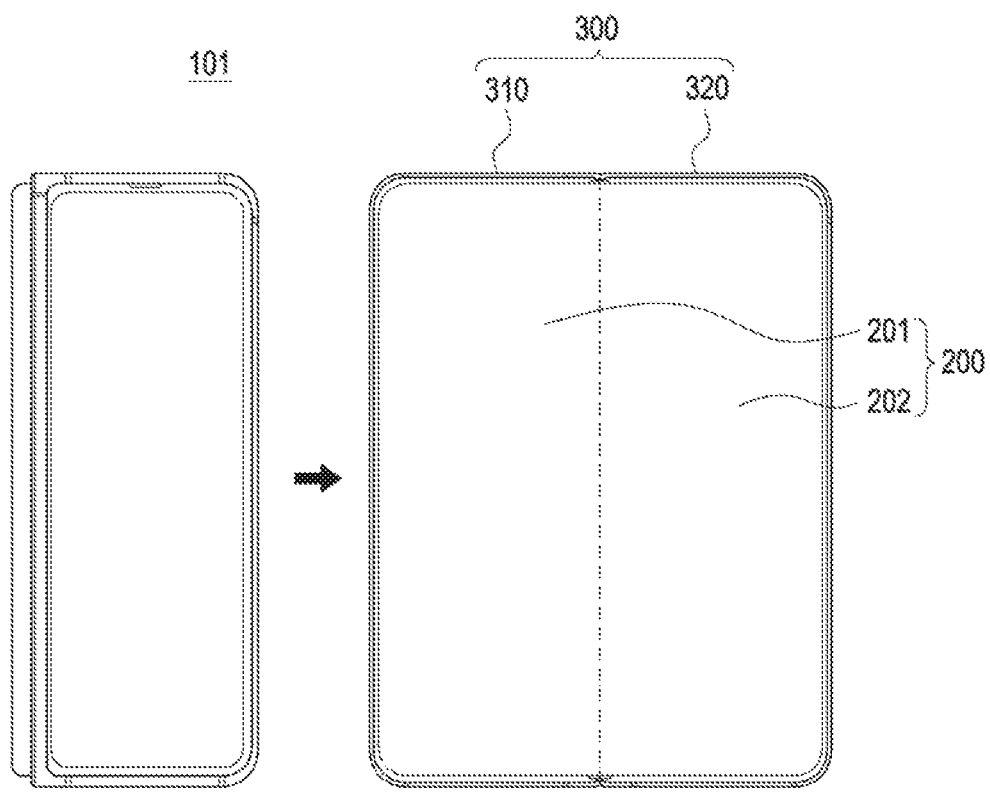
FIG. 5 illustrates examples of the folded state and the unfolded state of an electronic device according to certain embodiments.

FIG. 5 illustrates examples of the folded state and the unfolded state of an electronic device according to certain embodiments. The first housing structure 310 and the second housing structure 320 can form an angle from close to 0 degrees to 360 degrees. A range of angles centered at 180 degrees can be considered the unfolded state, such that the deviation of the angle formed by the first housing structure 310 and the second housing structure 320 from 180 degrees determines whether the device is in the folded state or unfolded state. In some embodiments, the deviation from 180 can be set high (at least 150 degrees) so that the first housing and the second housing would have to almost be in contact to be considered folded. In other embodiments, the deviation can be set low (10 degrees) so that even a slight bending is considered folded.

In some embodiments, only when the display surface of the first housing and the second housing are close to each other (e.g., within 30 degrees) is the electronic device considered in the folded state, while closeness of the rear structure—an angle approaching 360—is not considered the folded state. In certain embodiments, the hinge may not be reverse foldable (the first housing and second housing may not be capable of forming an angle exceeding 180 degrees.

Referring to FIG. 5, an electronic device 101 may include a foldable housing 300 and a flexible display 200. According to certain embodiments, the electronic device 101 may be of an in-folding type or an out-folding type. The in-folding type may mean the type in which the flexible display 200 is not exposed to the outside in the fully folded state. The out-folding type may mean the type in which the flexible display 200 is exposed to the outside in the fully folded state.

According to certain embodiments, the electronic device 101 may be a dual-foldable device configured in the in-out-folding type. FIG. 5 illustrates the out-folding state. As still another example, the flexible display 200 may have a rectangular shape with rounded corners, and may take a form having a narrow bezel area. The flexible display 200 includes a first area 201 disposed in the first housing structure 310 and a second area 202 disposed in the second housing structure 320, and the first area 201 and the second area 202 may be implemented in the same shape.

The descriptions of the components of the electronic device 101 of FIGS. 1 to 4 may be applicable to the components of the electronic device 101 of FIG. 5.

Figure 6:
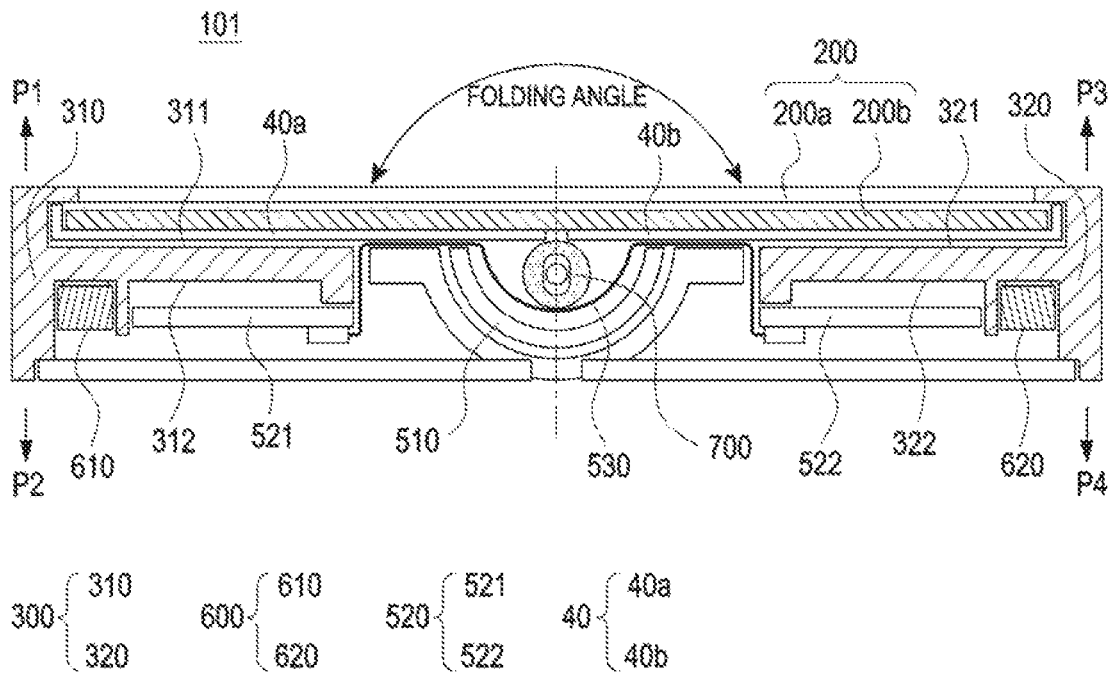
FIG. 6 is a cross-sectional view schematically illustrating an electronic device according to certain embodiments.

FIG. 6 is a cross-sectional view schematically illustrating an electronic device according to certain embodiments.

According to certain embodiments, the electronic device 101 may include a foldable housing 300, a flexible display 200, at least one sensor 700, a plurality of haptic actuators 600, a processor, and a memory. Referring to FIG. 6, the foldable housing 300 may be partially or entirely the same in configuration as the first housing structure 310 and the second housing structure 320 of FIGS. 2 to 5, the flexible display 200 may be partially or entirely the same in configuration as the display 200 of FIGS. 2 to 5, and the processor and the memory may be partially or entirely the same in configuration as the processor 120 and memory 130 of FIG. 1.

According to certain embodiments, the foldable housing 300 may include a hinge structure 510, a first housing structure 310, and a second housing structure 320. The foldable housing 300 may be configured such that the second housing structure 320 is rotatable with respect to the first housing structure 310. Depending on the rotation operation (e.g., folding state of the foldable housing 300), a folded state in which the first housing structure 310 and the second housing structure 320 face each other, an unfolded state in which the first housing structure 310 and the second housing structure 320 are disposed parallel to each other, or an intermediate status maintaining a predetermined angle may be provided. FIG. 6 illustrates the unfolded state (e.g., a flat state). In certain embodiments, the intermediate status can be considered the unfolded state while in other embodiments, the intermediate status can be considered the folded state. In certain embodiments, the intermediate status may be considered a third state. For example, when the angle between the first housing structure 310 and the second housing structure 320 is between 0 and 30 degrees, the electronic device is considered in the folded state, when the angle is 30 to 170 degrees, the electronic device is considered intermediate status, and when the angle is 170-180 degrees the electronic device is considered in the unfolded state.

According to certain embodiments, the first housing structure 310 may include a first face 311 oriented in a first direction P1 and a second face 312 oriented in a second direction P2, which is opposite the first direction P1. The second housing structure 320 may include a third face 321 oriented in a third direction P3 and a fourth face 322 oriented in a fourth direction P4, which is opposite the third direction P3. According to an embodiment, the first direction P1 and the third direction P3 may be configured to face each other by the rotation of the hinge structure 510. As still another example, the second direction P2 and the fourth direction P4 may be configured to face each other from the same direction by the rotation of the hinge structure 510. For example, in the folded state of the foldable housing 300, the first face 311 faces the third face 321, and in the unfolded state, the third direction P3 may be the same as the first direction P1. As still another example, in the folded state of the foldable housing 300, the second face 312 faces the fourth face 322, and in the unfolded state, the fourth direction P4 may be the same as the second direction P2.

According to certain embodiments, the flexible display 200 may be disposed to extend over the first face 311 and the third face 321. According to an embodiment, the flexible display 200 includes a front plate 200a and a display panel 200b and may include a bracket assembly 40 (e.g., the bracket assembly 40 in FIG. 4), which supports the flexible display 200, under the flexible display 200.

According to an embodiment, the front plate 200a may be formed of a material that is at least partially substantially transparent. For example, the front plate 200 may be formed of a glass plate or a polymer plate including various coating layers.

According to an embodiment, the display panel 200b may be visible through a large portion of the front plate 200a. In some embodiments, the edges of the display panel 200b may be formed to be substantially the same as the exterior shape of the front plate 200a adjacent thereto. In another embodiment (not illustrated), in order to enlarge the visible area of the display panel 200b, the distances between the outer edges of the display panel 200b and the outer edges of the front plate 200a may be substantially the same.

According to an embodiment, the flexible display 200 may be at least partially made of a material that conducts or permits radio waves or magnetic fields with minimal interference or energy loss. The flexible display 200 may be mounted with a display panel 200b and/or a touch panel. For example, the flexible display 200 may be an output device configured to output a screen, and may be used as an input device having a touch screen function. The display panel 200b (e.g., an (active) organic light-emitting diode) may include a display element layer including one or more pixels and a TFT layer connected to the display element layer.

According to certain embodiments, the bracket assembly 40 may be disposed on the rear face and/or the side face of the display panel 200b, and may be disposed to surround at least a portion of the front plate 200a and the display panel 200b. The bracket assembly 40 may include one or more plates on which the flexible display 200 is mounted, and may be for example, a SUS plate.

According to an embodiment, the bracket assembly 40 may be disposed between the flexible display 200 and the rear plate (e.g., the first rear cover 380 and the second rear cover 390 in FIG. 4). For example, the bracket assembly 40 may include a first bracket assembly 40a and a second bracket assembly 40b disposed to be spaced apart from each other. The first bracket assembly 40a may be disposed to face the first face 311 of the first housing structure 310, and the second bracket assembly 40b may be disposed to face the third face of the second housing structure 320. The first bracket assembly 40a and the second bracket assembly 40b may be disposed such that an area (folding area) in which the flexible display 200 is folded and an area corresponding thereto are spaced apart from each other with a predetermined gap therebetween.

According to certain embodiments, the at least one sensor 700 may be disposed in the foldable housing 300 and may detect the operating state of the foldable housing 300. The at least one sensor 700 may include, for example, an angle sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The at least one sensor may detect the operating state of the electronic device 101 and may generate an electrical signal or a data value corresponding to the detected state.

According to an embodiment, the at least one sensor 700 may include an angle sensor (e.g., a rotary sensor), and the angle sensor may be arranged to be connected to a hinge structure. For example, the angle sensor may measure the angle between the first face 311 and the third face 321 using a magnet. As another example, the sensing of the angle sensor may use ultrasonic waves or infrared rays.

According to an embodiment, the at least one sensor may include a proximity sensor, and may be disposed in the first housing structure 310 and/or the second housing structure 320. The proximity sensor may include an infrared light sensor, a hall sensor, a capacitive sensor, an ultrasonic sensor, and a magnetic field sensor. For example, the first housing structure 310 may include a sensor for a transmitter (TX), and the second housing structure 320 may include a sensor for a receiver (RX). As another example, when a hall sensor is applied as the proximity sensor, the TX may be a magnet and the RX may be a hall sensor, and when an infrared light sensor is applied as the proximity sensor, the TX may be an emitter and the RX may be a photo diode. The proximity sensor may detect the folded state of the foldable housing 300.

According to certain embodiments, the plurality of haptic actuators 600 may be disposed in the foldable housing 300. The plurality of haptic actuators 600 may output sound or vibration in response to various inputs such as a user's touch input so as to provide feedback corresponding to the inputs to the user. A plurality of haptic actuators may be provided. For example, a first haptic actuator 610 may be disposed within the first housing structure 310, and a second haptic actuator 620 may be disposed within the second housing structure 320. The first haptic actuator 610 and the second haptic actuator 620 may be controlled by the processor 120. In response to the control, a frequency, the intensity of a signal, the phase of a signal, and/or whether to activate a signal may be adjusted.

In certain embodiments, based on whether the electronic device 101 is in the folded state, the electronic device 101 may control the first haptic actuator 610 and the second haptic actuator 620 differently, or in the same manner. In some embodiments, when the electronic device 101 is in the folded state, the first haptic actuator 610 and the second haptic actuator 620 can be operated differently. For example, the vibration signal can have different phases. In some embodiments, when the electronic device 101 is in the unfolded state, the first haptic actuator 610 and the second haptic actuator 620 may be operated the same or as if they were one haptic actuator.

According to certain embodiments, the electronic device may include a processor 120 and memory 130. The processor 120 may execute software so as to control one or more different components (e.g., hardware or software components) of the electronic device 101, which are connected to the processor 120, and to perform various data processing or arithmetic operations. For example, the processor 120 may be disposed in the first housing structure 310 and/or the second housing structure 320, and may be operatively connected to the flexible display 200, the at least one sensor 700, the first haptic actuator 610, and/or the second haptic actuator 620. The processor 120 may provide an instruction or data received from at least one of the flexible display 200, the at least one sensor 700, the first haptic actuator 610, and/or the second haptic actuator 620 to a volatile memory of the memory 130, may process the instruction or data stored in the volatile memory, and may store resultant data in nonvolatile memory.

According to an embodiment, the memory 130 may store various data to be used by at least one component of electronic device 101 (e.g., the processor 120). For example, when the memory 130 is executed, the processor 120 may detect the folded state, the unfolded state, or the intermediate state of the foldable housing 300 using the at least one sensor 700, and may store instructions so as to independently control the first haptic actuator 610 and the second haptic actuator 620 at least partially based on the detected states.

According to an embodiment, when the foldable housing 300 is not in the unfolded state of the foldable housing 300, the instructions may enable the processor 120 to differently control the first haptic actuator 610 and the second haptic actuator 620. According to another embodiment, when the foldable housing 300 is not in the folded state of the foldable housing 300, the instructions may enable the processor 120 to control the first haptic actuator 610 and the second haptic actuator 620 in the same manner.

According to certain embodiments, the electronic device 101 may include a hinge structure 510, a board unit 520, and a flexible circuit board 530. The hinge structure 510 may be disposed in the central area of the foldable housing 300, and the first housing structure 310 may be rotatable about the hinge structure 510 with respect to the second housing structure 320. The first housing structure 310 may be connected to the hinge structure 510, and may include a first main circuit board 521. The second housing structure 320 may be connected to the hinge structure 510 and may include a second main circuit board 522. The hinge structure 510 may include a hinge cover that covers the hinge structure 510 when viewed from the outside, and the hinge cover may be disposed to face the flexible display 200. As another example, a flexible printed circuit (FPC) board may be disposed across the first housing structure 310 and the second housing structure 320.

Figure 7:
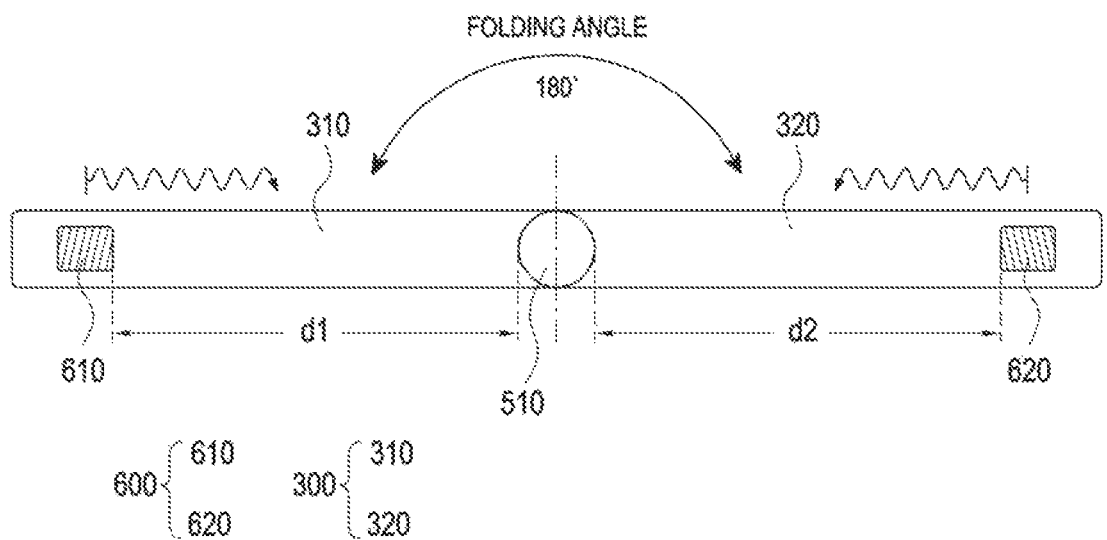
FIG. 7 is a cross-sectional view schematically illustrating the state in which an electronic device according to certain embodiments is unfolded.
Figure 8:
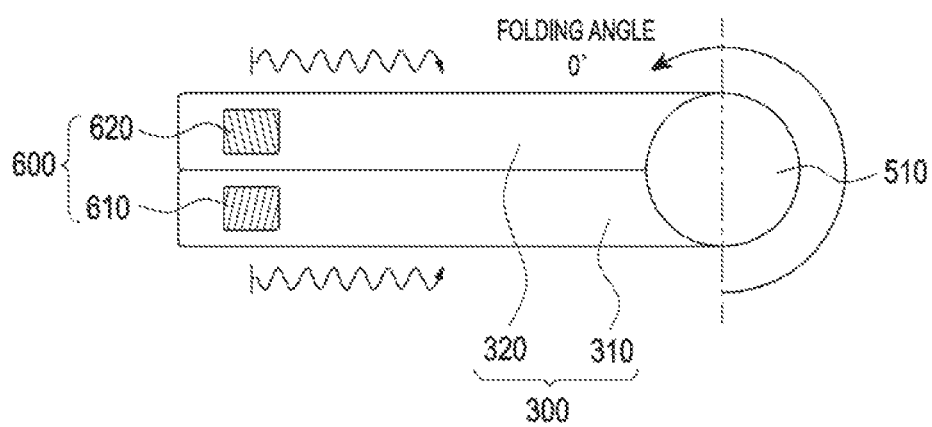
FIG. 8 is a cross-sectional view schematically illustrating the state in which the electronic device according to certain embodiments is folded.

FIG. 7 is a cross-sectional view schematically illustrating the state in which an electronic device according to certain embodiments is unfolded. FIG. 8 is a cross-sectional view schematically illustrating the state in which the electronic device according to certain embodiments is folded.

Referring to FIGS. 7 and 8, in certain embodiments, the electronic device 101 may include a foldable housing 300, a hinge structure 510, and a plurality of haptic actuators 600. The foldable housing 300, the hinge structure 510, and the plurality of haptic actuators 600 in FIGS. 7 and 8 may be partially or entirely the same in configuration as the foldable housing 300, the hinge structure 510, and the plurality of haptic actuators 600 in FIG. 6.

In certain embodiments, when the electronic device 101 is in the unfolded state, e.g., FIG. 7, the first haptic actuator 610 and the second haptic actuator 620 may operate the same as if they were one haptic actuator. In certain embodiments, where the electronic device 101 is in the folded state, e.g., FIG. 8, the electronic device 101 may control the first haptic actuator 610 and the second haptic actuator 620 differently. For example, the vibration signal can have different phases.

According to certain embodiments, the foldable housing 300 may include a hinge structure 510, a first housing structure 310, and a second housing structure 320. The foldable housing 300 may be configured such that the second housing structure 320 is rotatable with respect to the first housing structure 310 via the hinge structure 510. Depending on the rotation operation, the folded state in which the first housing structure 310 and the second housing structure 320 face each other or the unfolded state in which the first housing structure 310 and the second housing structure 320 are disposed parallel to each other may be provided. FIG. 7 illustrates the unfolded state and FIG. 8 illustrates the folded state.

Referring to FIGS. 7 and 8, a first haptic actuator 610 may be disposed in the first housing structure 310, and a second haptic actuator 620 may be disposed in the second housing structure 320. The first haptic actuator 610 and the second haptic actuator 620 may be implemented as a dual type having the same vibration form. For example, the first haptic actuator 610 and the second haptic actuator 620 may be configured as linear haptic actuators. As another example, the first haptic actuator 610 and the second haptic actuator 620 may be designed to vibrate up and down or to vibrate right and left. The first haptic actuator 610 and the second haptic actuator 620 may be controlled to have the same frequency, signal intensity, and signal phase by a processor (first control mode).

According to certain embodiments, the first haptic actuator 610 and the second haptic actuator 620 may be disposed at positions corresponding to each other with respect to the hinge structure 510. The first haptic actuator 610 may be disposed in the first housing structure 310 so as to be spaced apart from the hinge structure 510 by a first predetermined distance d1. For example, the first haptic actuator 610 may be disposed at an outer edge area of the first housing structure 310. The second haptic actuator 620 may be disposed in the second housing structure 320 so as to be spaced apart from the hinge structure 510 by a second predetermined distance d2. For example, the second haptic actuator 620 may be disposed at an outer edge area of the second housing structure 320. The first predetermined distance d1 and the second predetermined distance d2 may be the same. Accordingly, in the folded state of the foldable housing 300, the first haptic actuator 610 and the second haptic actuator 620 may be disposed to face each other. However, in addition to the configuration in which the first haptic actuator 610 and the second haptic actuator 620 are spaced at a corresponding interval as described above, through various design changes, the first haptic actuator 610 and the second haptic actuator 620 may be disposed at various positions in the first housing structure 310 and the housing structures 320, respectively.

According to certain embodiments, the first haptic actuator 610 may output a vibration in response to a user's touch input, and the output vibration may be transmitted to the entire area of the first housing structure 310 (e.g., vibration transmission). The second haptic actuator 620 may output a vibration in response to a user's touch input, and the output vibration may be transmitted to the entire area of the second housing structure 320. FIGS. 7 and 8 schematically illustrate the vibration transmission shapes of the first haptic actuator 610 and the second haptic actuator 620.

Figure 9:
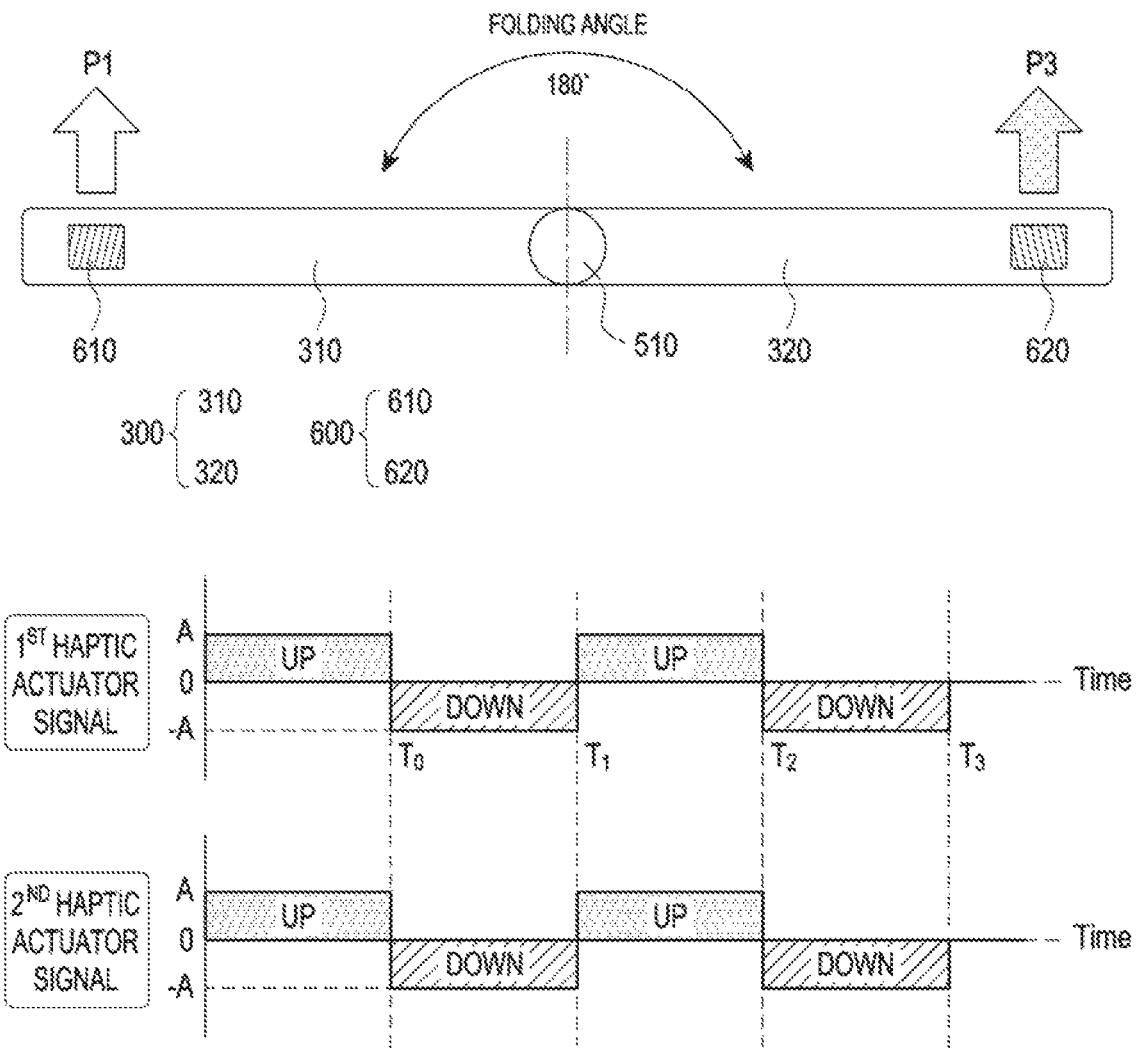
FIG. 9 is a cross-sectional view schematically illustrating the state in which an electronic device according to another embodiment is unfolded.
Figure 10:
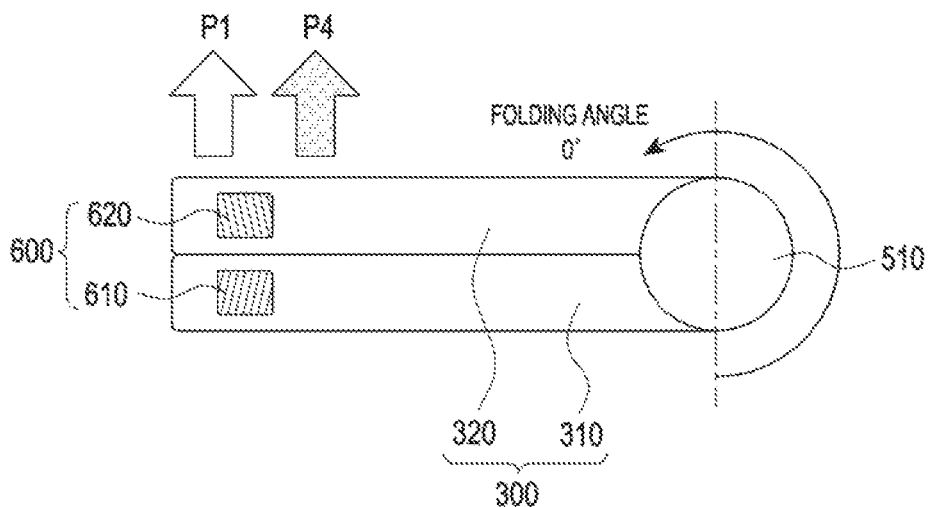
FIG. 10 is a cross-sectional view schematically illustrating the state in which the electronic device of FIG. 9 is folded.
Figure 10:
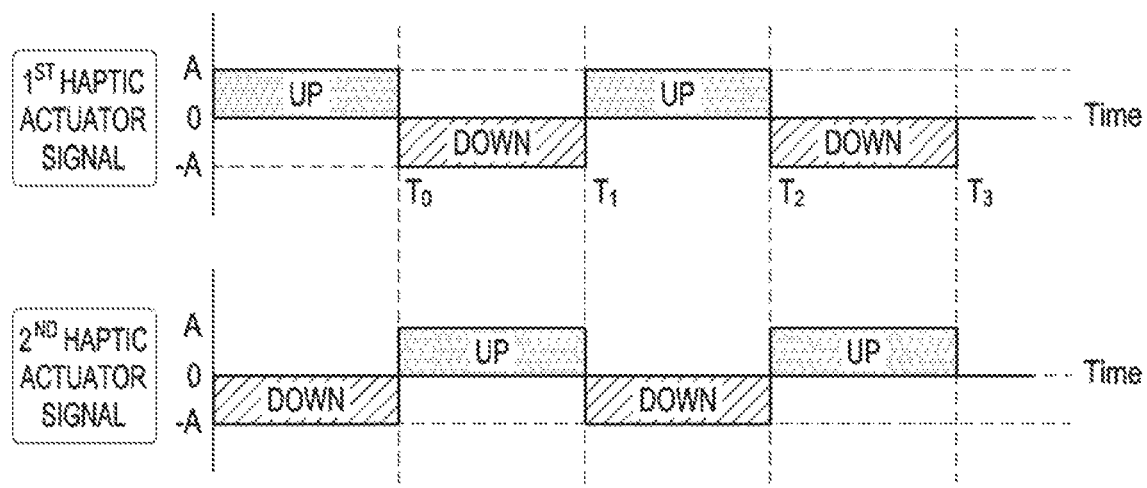
Figure 11:
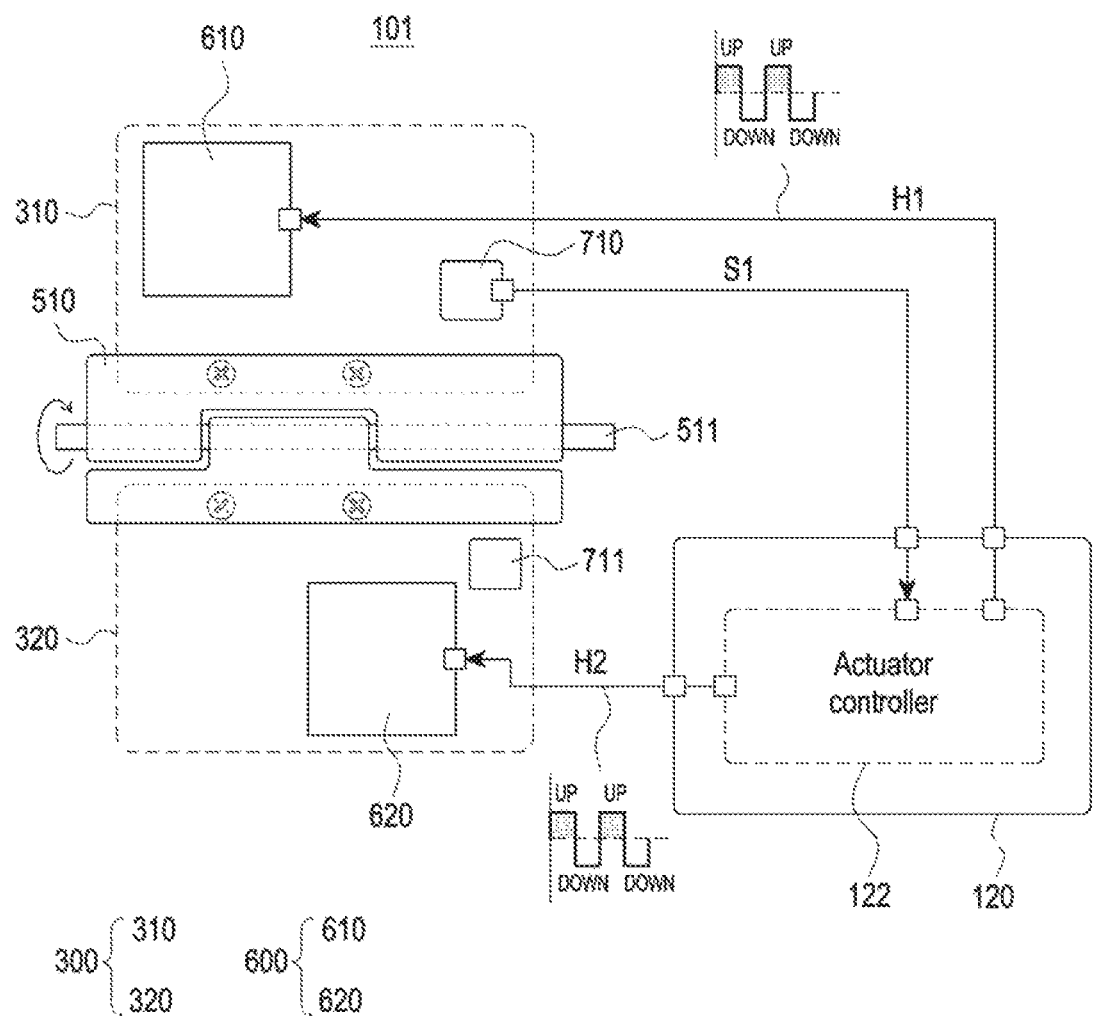
FIG. 11 is a block diagram schematically illustrating an arrangement relationship between internal components in the state in which an electronic device according to certain embodiments is unfolded.

FIGS. 9-12 illustrate an embodiment of the electronic device 101. In FIG. 9, the electronic device 101 is in the unfolded state. FIG. 11 illustrates a Hall sensor 710 and a magnet 711. Since the electronic device 101 in FIG. 11 is unfolded, the Hall sensor 710 and the magnet 711 are apart, and the Hall sensor 710 does not detect the magnet. The Hall sensor 710 provides a signal S1 indicating that the device is in the unfolded state to the actuator controller 122. In response to signal S1 indicating that the Hall sensor 710 failed to detect the magnet 711, the actuator controller 122 transmits signals to the first haptic actuator 610 and the second haptic actuator 620 to operate the same as if they were one unit. The first haptic actuator signal and the second haptic actuator signal are in phase.

Figure 12:
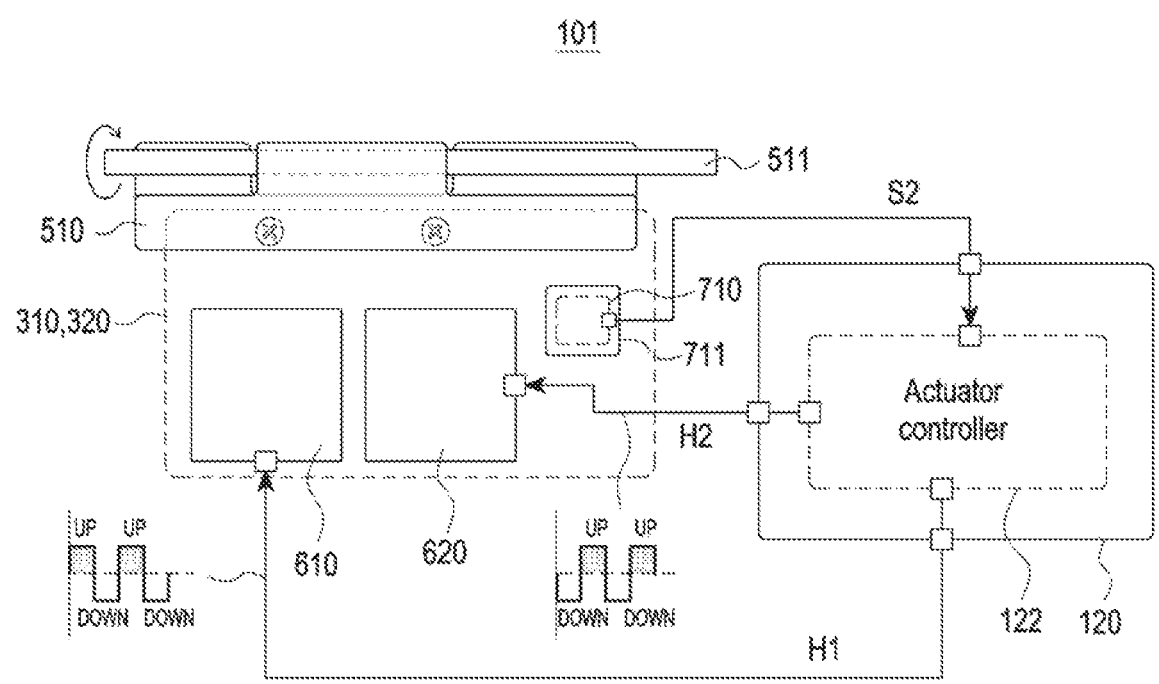
FIG. 12 is a block diagram schematically illustrating an arrangement relationship between internal components in the state in which the electronic device of FIG. 11 is folded.

In FIG. 10, the electronic device 101 is in the folded state. FIG. 12 illustrates the Hall sensor 710 and the magnet 711 facing each other, and the Hall sensor 710 detects the magnet 711. The Hall sensor 710 provides a signal S1 indicating that the device is in the folded state to the actuator controller 122. In response to signal S1 indicating that the Hall sensor 710 detected the magnet, the actuator controller 122 transmits vibration signals to the first haptic actuator 610 and the second haptic actuator 620 that are phase offset by 180 degrees.

FIG. 9 is a cross-sectional view schematically illustrating the state in which an electronic device according to still another embodiment is unfolded. FIG. 10 is a cross-sectional view schematically illustrating the state in which the electronic device of FIG. 9 is folded.

Referring to FIGS. 9 and 10, in certain embodiments, the electronic device 101 may include a foldable housing 300, a hinge structure 510, and a plurality of haptic actuators 600. The foldable housing 300, the hinge structure 510, and the plurality of haptic actuators 600 in FIGS. 9 and 10 may be partially or entirely the same in configuration as the foldable housing 300, the hinge structure 510, and the plurality of haptic actuators 600 in FIG. 6.

According to certain embodiments, the foldable housing 300 may include a hinge structure 510, a first housing structure 310, and a second housing structure 320. The foldable housing 300 may be configured such that the second housing structure 320 is rotatable with respect to the first housing structure 310 via the hinge structure 510.

FIG. 9 illustrates the unfolded state, and FIG. 10 illustrates the folded state.

Referring to FIGS. 9 and 10, a first haptic actuator 610 may be disposed in the first housing structure 310, and a second haptic actuator 620 may be disposed in the second housing structure 320. The first haptic actuator 610 and the second haptic actuator 620 may be implemented as a dual type having the same vibration form (e.g., up and down vibration).

According to an embodiment, when the foldable housing 300 is not in the unfolded state, the processor 120 may differently control the first haptic actuator 610 and the second haptic actuator 620 on the basis of the instructions stored in the memory. For example, in the state in which the foldable housing 300 is folded, the first haptic actuator 610 and the second haptic actuator 620 may output vibrations having opposite phases (second control mode). Accordingly, when the foldable housing 300 is viewed from above in the state in which the foldable housing 300 is folded, the first haptic actuator 610 and the second haptic actuator 620 output vibrations oriented in the same direction, thereby limiting vibration reduction.

Referring to FIG. 9, in the state in which the foldable housing 300 is in a tablet mode (e.g., the unfolded state or the intermediate state), the first haptic actuator 610 and the second haptic actuator 620 may perform a first operation. For example, the processor may provide a first haptic signal (e.g., a forward haptic direction signal) to the first haptic actuator 610. As illustrated in the top graph in FIG. 9, in the first haptic signal, up and down signals may be alternately generated as time passes. The first haptic actuator 610 receiving the first haptic signal may output a vibration of a predetermined phase oriented in the first direction P1 of the first housing structure 310.

As another example, the processor may provide a first haptic signal (e.g., a forward haptic direction signal) to the second haptic actuator 620. As illustrated in the bottom graph in FIG. 9, in the first haptic signal, up and down signals may be alternately generated as time passes. The second haptic actuator 620 receiving the first haptic signal may output a vibration of a predetermined phase oriented in the third direction P3 of the second housing structure 320.

Referring to FIG. 10, in the state in which the foldable housing 300 is in a mobile mode (e.g., the folded state), the first haptic actuator 610 may perform a first operation, and the second haptic actuator 620 may perform a second operation. For example, the processor may provide the first haptic signal (e.g., a forward haptic direction signal) to the first haptic actuator 610. As illustrated in the top graph in FIG. 10, in the first haptic signal, up and down signals may be alternately generated as time passes. The first haptic actuator 610 receiving the first haptic signal may output a vibration of a predetermined phase oriented in the first direction P1 of the first housing structure 310.

As another example, the processor may provide a second haptic signal (e.g., a reverse haptic direction signal) to the second haptic actuator 620. As illustrated in the bottom graph in FIG. 10, in the second haptic signal, down and up signals may be alternately generated as time passes in a phase opposite that of the first haptic signal. The second haptic actuator 620 receiving the second haptic signal may output a vibration of a predetermined phase oriented in the fourth direction P4 of the second housing structure 320.

According to an embodiment, in the interval of 0 to $T_0$, when the first haptic actuator 610 is controlled by an up signal having intensity A, the second haptic actuator 620 may be controlled by a down signal having intensity A. In the interval of 0 to $T_1$, when the first haptic actuator 610 is controlled by a down signal having intensity A, the second haptic actuator 620 may be controlled by an up signal having intensity A.

According to certain embodiments, according to the second control mode, in the state in which the foldable housing 300 is folded, vibrations provided from the first haptic actuator 610 and the second haptic actuator 620 may be implemented to be oriented in the same direction (e.g., the first direction P1 and the fourth direction P4) and thus optimal haptic feedback may be provided to the user since the vibrations do not cancel each other.

FIG. 11 is a block diagram schematically illustrating an arrangement relationship between internal components in the state in which an electronic device according to certain embodiments is unfolded. FIG. 12 is a block diagram schematically illustrating an arrangement relationship between internal components in the state in which the electronic device of FIG. 11 is folded.

Referring to FIGS. 11 and 12, in certain embodiments, the electronic device 101 may include a first housing structure 310, a second housing structure 320, a hinge structure 510, a plurality of haptic actuators 600, at least one sensor 710, and a processor 120. The first housing structure 310, the second housing structure 320, the hinge structure 510, the plurality of haptic actuators 600, the at least one sensor 710, and the processor 120 in FIGS. 11 and 12 may be partially or entirely the same in configuration as the first housing structure 310, the second housing structure 320, the hinge structure 510, the plurality of haptic actuators 600, and the at least one sensor 700 in FIG. 6, and the processor 120 of FIG. 1.

Referring to FIG. 11, the first haptic actuator 610 and the second haptic actuator 620 may perform the first operation according to the first control mode of FIG. 9. Referring to FIG. 12, the first haptic actuator 610 and the second haptic actuator 620 may perform the first operation and the second operation according to the second control mode of FIG. 10.

According to certain embodiments, the at least one sensor may include a proximity sensor (e.g., a hall sensor) 710. For example, a hall sensor 710 may be disposed in the first housing structure 310, and a magnet 711 may be disposed in the second housing structure 320. As another example, a magnet may be disposed in the first housing structure 310, and a hall sensor may be disposed in the second housing structure 320. The hall sensor 710 and the magnet 711 may be disposed to be spaced apart from each other with the hinge structure 510 interposed therebetween.

According to certain embodiments, the electronic device may recognize the unfolded state and the folded state of the foldable housing 300 via the hall sensor 710. For example, in the unfolded state (e.g., see FIG. 11), the hall sensor 710 may generate a first sensor signal S1 and may transmit the first sensor signal S1 to the actuator controller 122 within the processor 120. The actuator controller 122 may control the first haptic actuator 610 and the second haptic actuator 620 in the same manner on the basis of the instructions stored in the memory (e.g., the memory 130 in FIG. 1). The actuator controller 122 may control the first haptic actuator 610 to generate vibrations according to a first haptic signal H1 and the second haptic actuator 620 to generate vibrations according to the first haptic signal H1. The description of the first haptic signal in FIG. 9 may be applicable to that of the first haptic signal H1.

As another example, in the folded state (see, e.g., FIG. 12), the hall sensor 710 and the magnet 711 may be disposed to face each other. The hall sensor 710 may generate a second sensor signal S2 different from the first sensor signal S1 in cooperation with the magnet 711 and may transmit the second sensor signal S2 to the actuator controller 122 within the processor 120. The actuator controller 122 may differently control the first haptic actuator 610 and the second haptic actuator 620 on the basis of the instructions stored in the memory (e.g., the memory 130 in FIG. 1). The actuator controller 122 may control the first haptic actuator 610 to generate vibrations in response to the first haptic signal H1 and the second haptic actuator 620 to generate vibrations in response to the second haptic signal H2. The description of the first haptic signal and the second haptic signal in FIG. 9 may be applicable to that of the first haptic signal H1 and the second haptic signal H2.

FIGS. 13-16 are schematic diagrams illustrating operations of haptic actuators according to an operation of changing an electronic device according to another embodiment from a folded state to an unfolded state. In certain embodiments, the vibration signal for the first haptic actuator 610 and the second haptic actuator 620 can have a phase relationship of 180 degrees minus the angle between the first housing 310 and the second housing 320. That is, when the device is in the fully unfolded state, the first housing 310 and the second housing 320 are at a 180 degree angle, and the phase difference is 0. When the electronic device 101 is in the folded state, the angle is 0 and the phase difference is 180.

Figure 13:
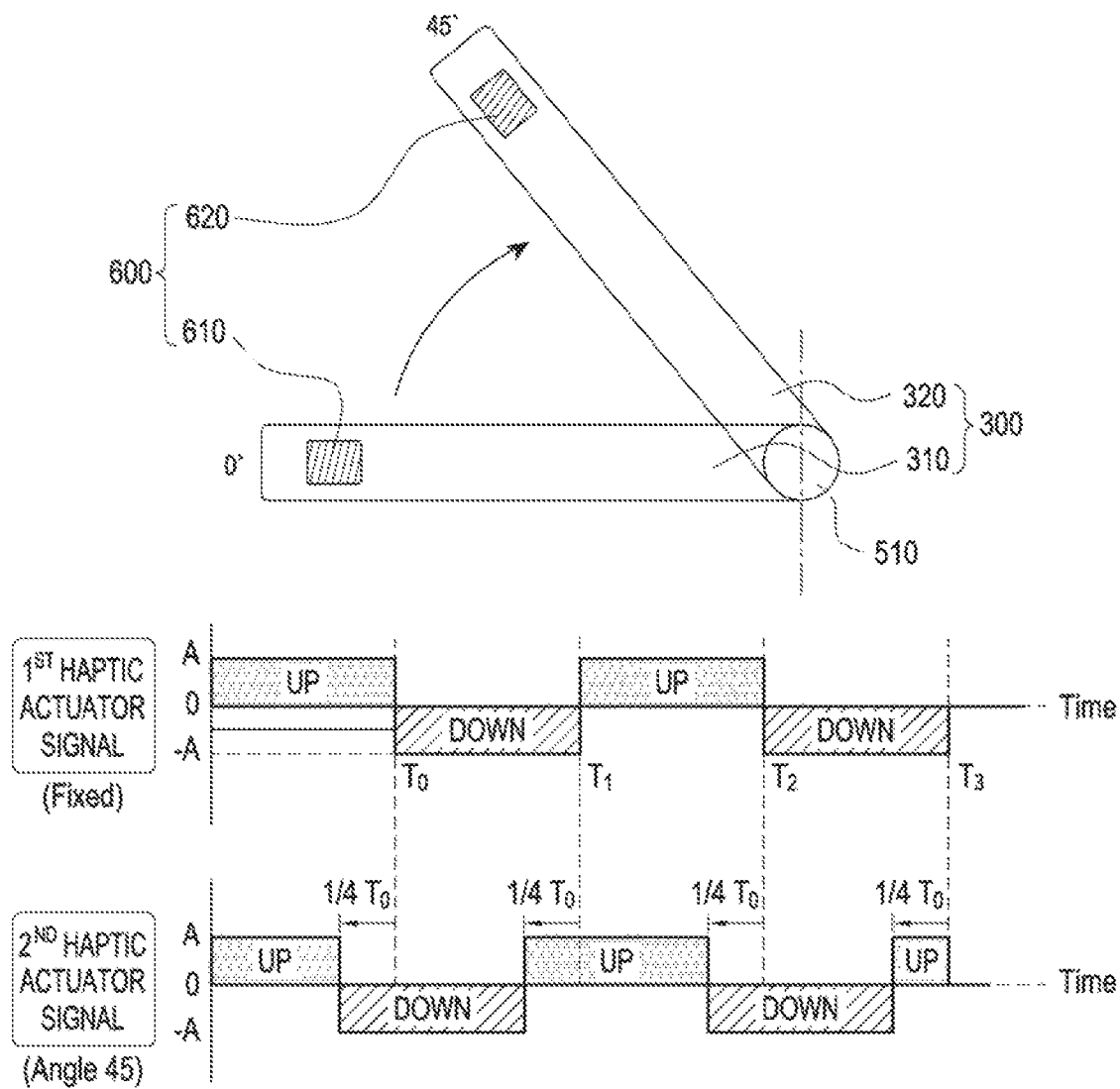
FIG. 13 and FIG. 14 are schematic diagrams illustrating operations of haptic actuators according to an operation of changing an electronic device according to certain embodiments from a folded state to an unfolded state.
Figure 14:
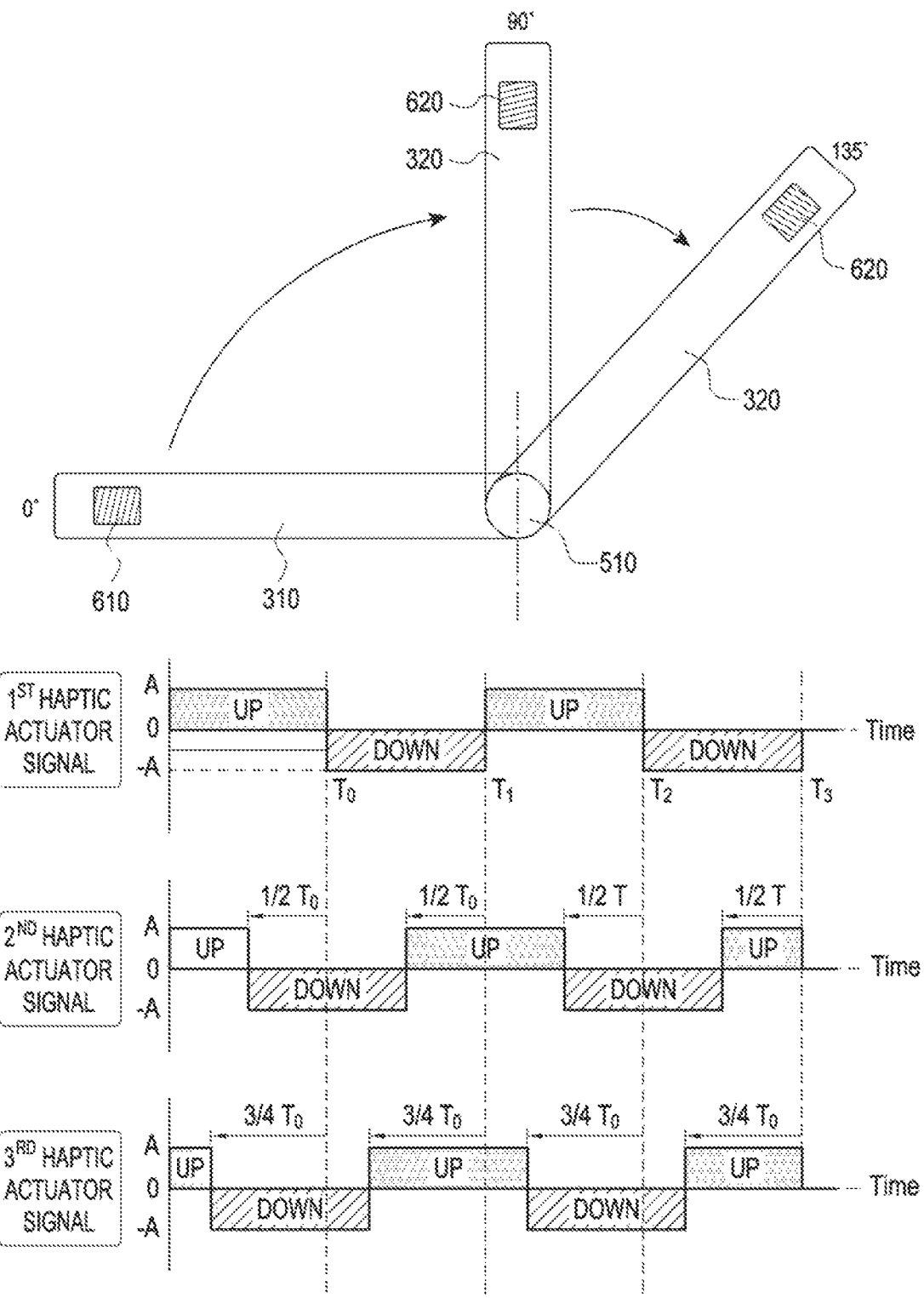

Referring to FIGS. 13 and 14, in certain embodiments, the electronic device 101 may include a foldable housing 300, a hinge structure 510, and a plurality of haptic actuators 600. The foldable housing 300, the hinge structure 510, and the plurality of haptic actuators 600 in FIGS. 13 and 14 may be partially or entirely the same in configuration as the foldable housing 300, the hinge structure 510, and the plurality of haptic actuators 600 in FIG. 6.

According to certain embodiments, the foldable housing 300 may include a hinge structure 510, a first housing structure 310, and a second housing structure 320. The foldable housing 300 may be configured such that the second housing structure 320 is rotatable with respect to the first housing structure 310 via the hinge structure 510. Depending on the rotational operation, the folding state of the electronic device 101 may vary such that the folding angle (ex. rotary angle) of the second housing structure 320 forms 45 degrees, 90 degrees, 135 degrees, or the like with respect to the first housing structure 310. According to the rotation operation, the folding state of the electronic device 101 may be classified into a folded state, a unfolded state, and an intermediate state.

According to certain embodiments, FIGS. 13 and 14 illustrate the intermediate status, and FIG. 8 may be applicable to the folded status. Hereinafter, the intermediate state (e.g., a state varying from the folded state to the unfolded state) will be described.

Referring to FIGS. 13 and 14, the first haptic actuator 610 may be disposed in the first housing structure 310, and the second haptic actuator 620 may be disposed in the second housing structure 320. The first haptic actuator 610 and the second haptic actuator 620 may be implemented as a dual type having the same vibration form (e.g., up and down vibration).

According to an embodiment, in the intermediate state of the foldable housing 300, the processor 120 may differently control the first haptic actuator 610 and the second haptic actuator 620 on the basis of the instructions stored in the memory. For example, according to the operation in which the foldable housing 300 varies from the folded state to the unfolded state, the first haptic actuator 610 and the second haptic actuator 620 output vibrations having a phase difference with respect to time (the third control mode). For example, the third control mode may be in the form in which a fixed direction haptic control method of the first haptic actuator 610 and a variable direction haptic control method of the second haptic actuator 620 are mixed.

Referring to FIGS. 13 and 14, in the state in which the foldable housing 300 is in the intermediate state, the first haptic actuator 610 may perform a first operation, and the second haptic actuator 620 may perform a third operation. As another example, in the state in which the foldable housing 300 is in the intermediate state, the first haptic actuator 610 may perform a third operation, and the second haptic actuator 620 may perform a first operation. Hereinafter, an embodiment in which the first haptic actuator 610 performs the first operation and the second haptic actuator 620 performs the first operation will be described.

According to certain embodiments, in the state in which the foldable housing 300 is in the intermediate state, the processor may provide the first haptic signal (e.g., a forward haptic direction signal) to the first haptic actuator 610. As illustrated in the top graphs in FIGS. 13 and 14, in the first haptic signal, up and down signals may be alternately generated as time passes. The first haptic actuator 610 receiving the first haptic signal may output a vibration of a predetermined phase oriented in the first direction of the first housing structure 310.

According to certain embodiments, in the state in which the foldable housing 300 is in the intermediate state, the processor may provide the third haptic signal to the second haptic actuator 620. As illustrated in the bottom graphs in FIGS. 13 and 14, in the third haptic signal, up and down signals may be alternately generated as time passes. As another example, the third haptic signal may generate a signal phase-shifted in real time depending on a change in the rotary angle (e.g., a change in the angle of the second housing structure 320 with respect to the first housing structure 310). The phase-shifted signal may be determined by determining a direction control pattern corresponding to the rotary angle by the processor.

Referring to FIG. 13, when the folding angle (ex.rotary angle) of the second housing structure 320 with respect to the first housing structure 310 is 45 degrees, the second haptic actuator 620 may operate by receiving a $(3\text{-}1)^{th}$ haptic signal corresponding to a signal phase-shifted by a gap of $\frac{1}{4}T_0$ compared with the first haptic signal from the processor (a $(3\text{-}1)^{th}$ operation). For example, the second haptic actuator 620 may output a vibration, which is controlled as an up signal having intensity A in the interval of 0 to $\frac{3}{4}T_0$ and is controlled as a down signal having intensity A in the interval of $\frac{3}{4}T_0$ to $\frac{3}{4}T_1$.

Referring to FIG. 14, when the folding angle (ex. rotary angle) of the second housing structure 320 with respect to the first housing structure 310 is 90 degrees, the second haptic actuator 620 may operate by receiving a $(3\text{-}2)^{th}$ haptic signal corresponding to a signal phase-shifted by a gap of $\frac{1}{2}T_0$ compared with the first haptic signal from the processor (a $(3\text{-}2)^{th}$ operation). For example, the second haptic actuator 620 may output a vibration, which is controlled as an up signal having intensity A in the interval of 0 to $\frac{1}{2}T_0$ and is controlled as a down signal having intensity A in the interval of $\frac{1}{2}T_0$ to $\frac{1}{2}T_1$.

Referring to FIG. 14, when the folding angle of the second housing structure 320 with respect to the first housing structure 310 is 135 degrees, the second haptic actuator 620 may operate by receiving a $(3\text{-}3)^{th}$ haptic signal corresponding to a signal phase-shifted by a gap of $\frac{1}{4}T_0$ compared with the first haptic signal from the processor (a (3-3)$^{th}$ operation). For example, the second haptic actuator 620 may output a vibration, which is controlled as an up signal having intensity A in the interval of 0 to ¼$T_0$ and is controlled as a down signal having intensity A in the interval of ¼$T_0$ to ¼$T_1$.

Figure 15:
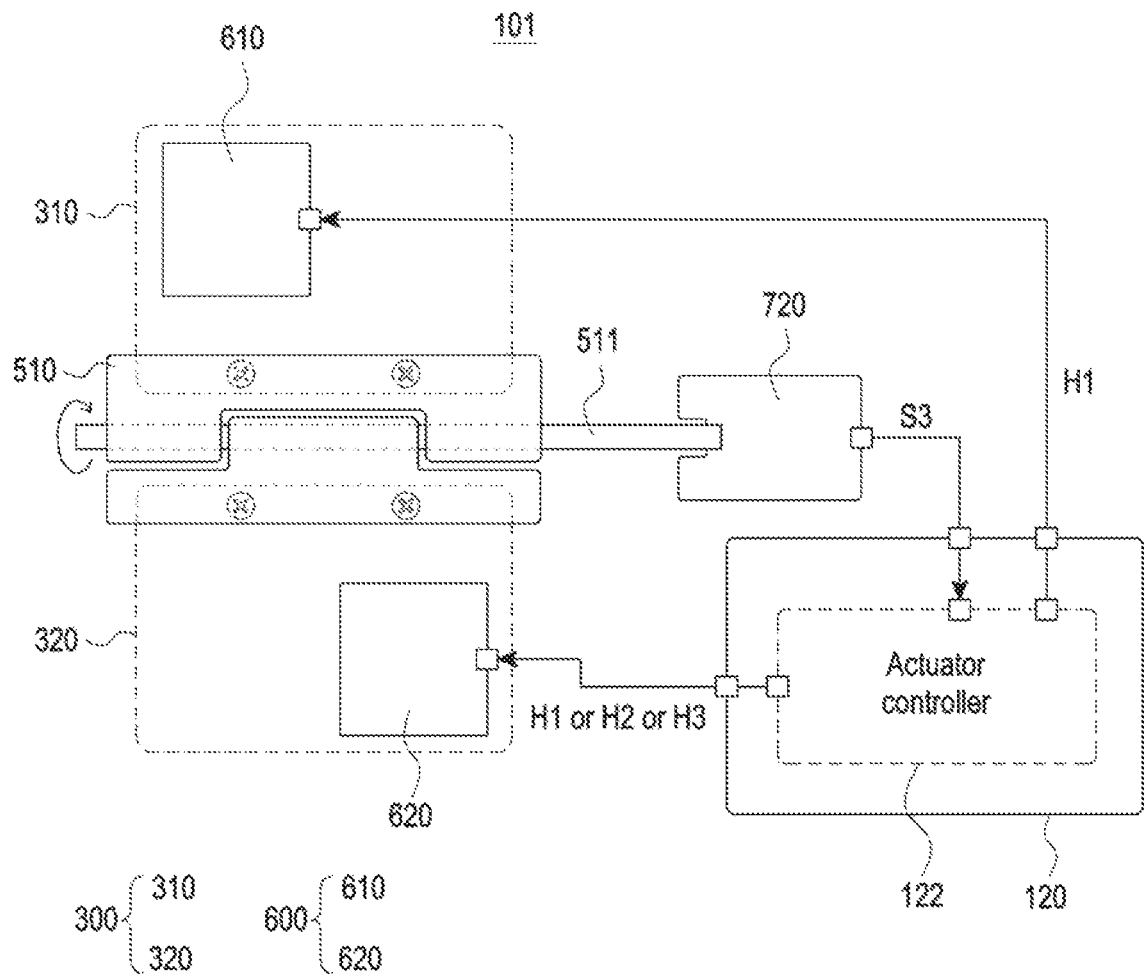
FIG. 15 is a block diagram schematically illustrating an arrangement relationship between internal components in the state in which an electronic device according to certain embodiments is unfolded.
Figure 16:
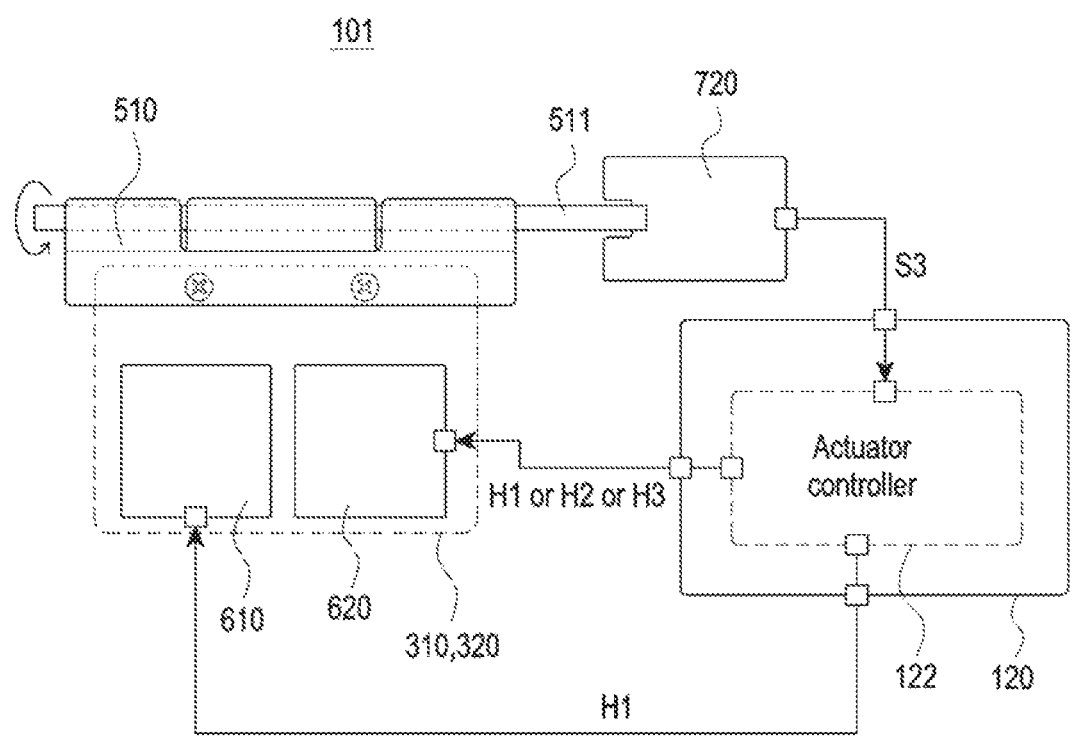
FIG. 16 is a block diagram schematically illustrating an arrangement relationship between internal components in the state in which the electronic device of FIG. 15 is folded.
Figure 17:
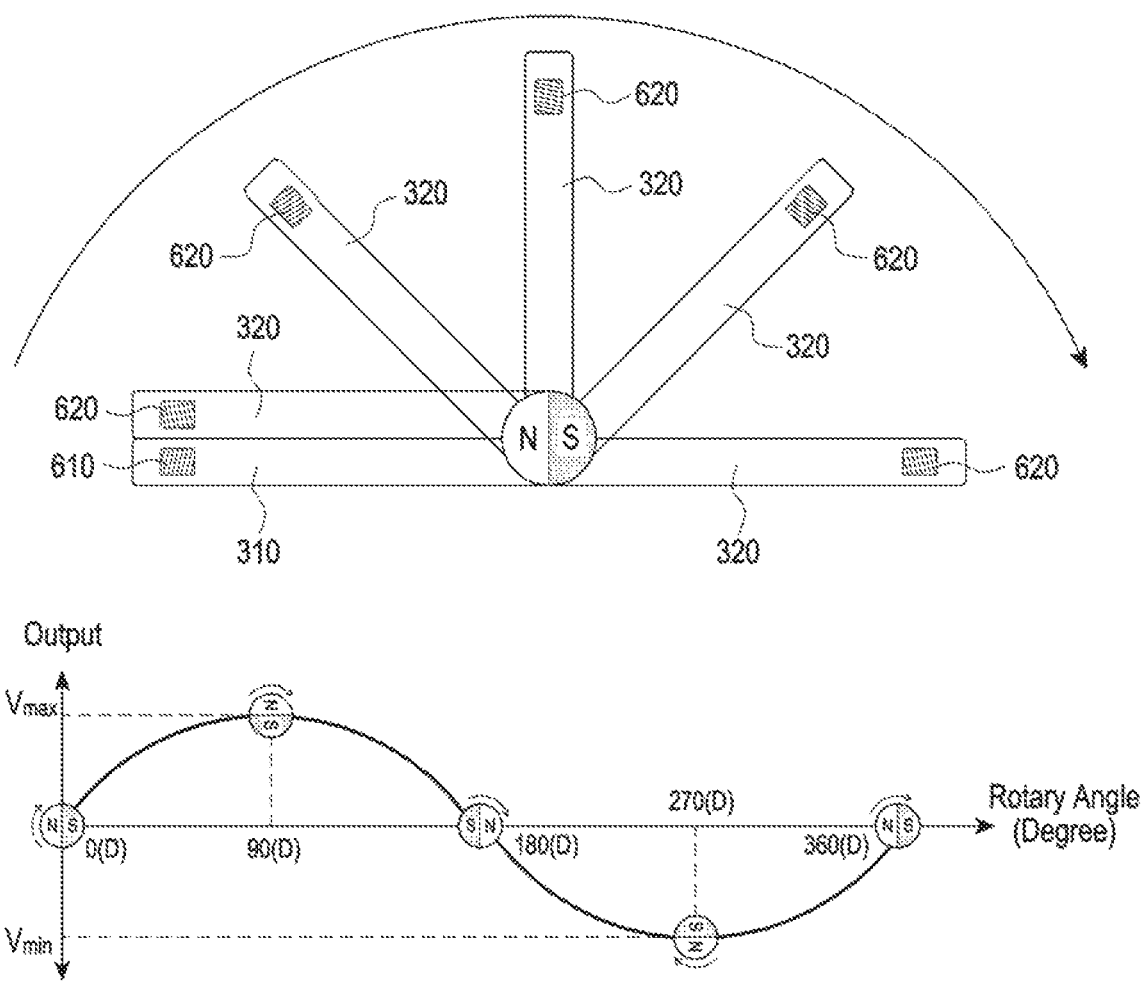
FIG. 17 is a view representing a voltage output value according to rotation of a rotary angle sensor disposed in an electronic device according to certain embodiments.

FIG. 15 is a block diagram schematically illustrating an arrangement relationship between internal components in the state in which an electronic device according to certain embodiments is unfolded. FIG. 16 is a block diagram schematically illustrating an arrangement relationship between internal components in the state in which the electronic device of FIG. 15 is folded. FIG. 17 is a view representing a voltage output value according to rotation of a rotary angle sensor disposed in an electronic device according to certain embodiments.

Referring to FIGS. 15 and 16, in certain embodiments, the electronic device 101 may include a first housing structure 310, a second housing structure 320, a hinge structure 510, a plurality of haptic actuators 600, at least one sensor 720, and a processor 120. The first housing structure 310, the second housing structure 320, the hinge structure 510, the plurality of haptic actuators 600, the at least one sensor 720, and the processor 120 in FIGS. 15 and 16 may be partially or entirely the same in configuration as the first housing structure 310, the second housing structure 320, the hinge structure 510, the plurality of haptic actuators 600, the at least one sensor 700 in FIG. 6, and the processor 120 of FIG. 1.

Referring to FIGS. 15 and 16, the first haptic actuator 610 and the second haptic actuator 620 may operate in the first control mode of FIG. 9. As another example, the first haptic actuator 610 and the second haptic actuator 620 may operate in the second control mode of FIG. 10. As still another example, the first haptic actuator 610 and the second haptic actuator 620 may operate in the third control mode of FIGS. 13 and 14.

In certain embodiments, the intensity of the vibration may vary based on the angle between the first housing and the second housing.

According to certain embodiments, the at least one sensor 700 may include a rotary angle sensor (e.g., a rotary sensor) 720. For example, the rotary angle sensor 720 may be disposed at one end of the hinge structure 510. The rotary angle sensor 720 may check a change in resistance value in response to the rotation of the shaft 511 of the hinge structure 510, and may recognize a folding angle or an rotary angle (e.g., the folding angle of the second housing structure 320 relative to the first housing structure 310) via voltage output measurement corresponding thereto.

According to an embodiment, the rotary angle sensor 720 may include a sensor housing, a rotary shaft 511 extending from the outside to the inside of the sensor housing, a magnet 723 coupled to the shaft 511, and a sensor spaced apart from the magnet 723. Referring to FIG. 17, the rotary angle sensor 720 may determine an output voltage pattern depending on the rotation of the magnet 723 coupled to the shaft 511. For example, when the folded state (e.g., the folding angle being 0 degrees) is set as the reference angle of the rotary angle sensor 720, depending on the unfolding operation, the rotary angle sensor 720 may output the maximum output voltage in the state in which the folding angle is 90 degrees and may output the minimum output voltage in the state in which the folding angle is 270 degrees. As another example, when the folding angle in the interval in which the electronic device is in the folded state is 0 degrees to 180 degrees, the rotary angle sensor 720 may output only a positive (+) voltage value.

According to certain embodiments, in the electronic device, the rotary angle sensor 720 may recognize an operation of changing from the folded state to the unfolded state of the foldable housing 300. For example, the rotary angle sensor 720 may generate a third sensor signal S3 variable depending on the rotation of the magnet 723 and may transmit the variable third sensor signal S3 to the actuator controller 122 within the processor 120. The actuator controller 122 may differently control the first haptic actuator 610 and the second haptic actuator 620 on the basis of the instructions stored in the memory (e.g., the memory 130 in FIG. 1). For example, in the third control mode, the actuator controller 122 may control the first haptic actuator 610 to generate vibrations according to the first haptic signal H1 and the second haptic actuator 620 to generate vibrations according to the third haptic signal H3.

Figure 18:
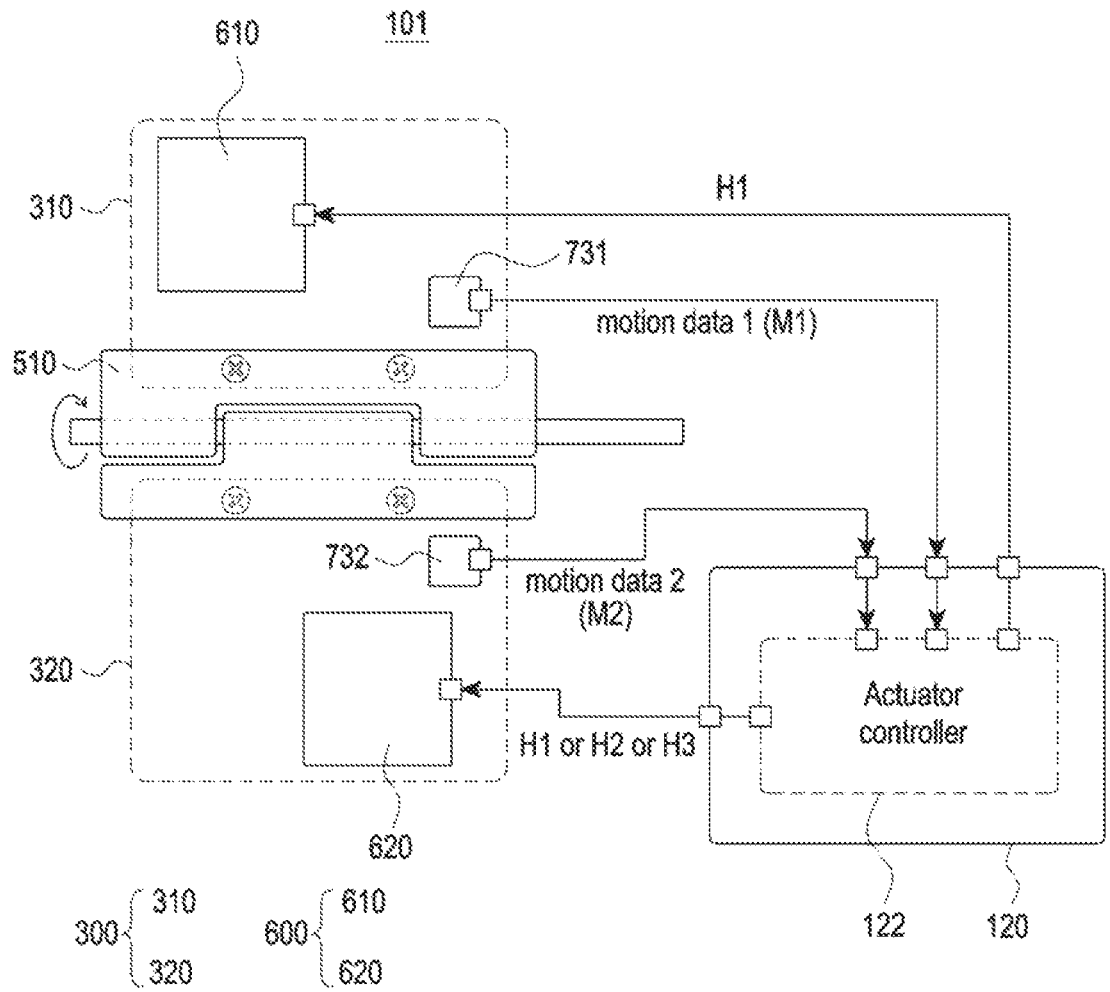
FIG. 18 is a block diagram schematically illustrating an arrangement relationship between internal components of an electronic device including a motion sensor, according to certain embodiments.

FIG. 18 is a block diagram schematically illustrating an arrangement relationship between internal components of an electronic device including a motion sensor, according to certain embodiments.

Referring to FIG. 18, in certain embodiments, the electronic device 101 may include a first housing structure 310, a second housing structure 320, a hinge structure 510, a plurality of haptic actuators 600, a plurality of sensors 731 and 732, and a processor 120. The first housing structure 310, the second housing structure 320, the hinge structure 510, the plurality of haptic actuators 600, the plurality of sensors 731 and 732, and the processor 120 in FIG. 18 may be partially or entirely the same in configuration as the first housing structure 310, the second housing structure 320, the hinge structure 510, the plurality of haptic actuators 600, and the at least one sensor 700 in FIG. 6, and the processor 120 of FIG. 1.

Referring to FIG. 18, the first haptic actuator 610 and the second haptic actuator 620 may operate in a fourth control mode. According to certain embodiments, the plurality of sensors may include motion sensors 731 and 732. For example, a first motion sensor 731 may be disposed in the first housing structure 310, and a second motion sensor 732 may be disposed in the second housing structure 320. The first motion sensor 731 and the second motion sensor 732 may be spaced apart from each other in the hinge structure 510 at mutually corresponding intervals from the hinge structure 510 with the hinge structure 510 interposed therebetween.

Table 1 below represents operations according to the fourth control mode of the haptic actuators and the motion sensors depending on folding angles.

TABLE 1

| Folding Angle [Degree] | 1$^{st}$ Housing Structure | | 2$^{nd}$ Housing Structure | |
|---|---|---|---|---|
| | 1$^{st}$ Actuator | 1$^{st}$ Motion Sensor | 2$^{nd}$ Actuator | 2$^{nd}$ Motion Sensor |
| 0 Degree | First operation | Don't Care | second operation | Don't Care |
| 0 < A < 180 | Fixed | Action-less | Variable | Movement |
| 0 < A < 180 | Variable | Movement | Fixed | Action-less |
| 180 Degree | First operation | Don't Care | First operation | Don't Care |

According to certain embodiments, in the state in which the second housing structure 320 is folded relative to the first housing structure 310 (e.g., 0 degrees), the first motion sensor 731 and the second motion sensor 732 may detect the rotation amount of the shaft 511 of the hinge structure 510, or may recognize that the folding angle is 0 degrees by interacting with each other and may transmit the same to the processor 120. Hereinafter, in response to the signal transmitted by the processor 120, the first haptic actuator 610 may perform a first operation and the second haptic actuator 620 may perform a second operation. The description of the first operation and the second operation of FIGS. 9 and 10 may be applicable to the first operation and the second operation.

According to certain embodiments, in the state in which the second housing structure 320 is unfolded relative to the first housing structure 310 (e.g., 180 degrees), the first motion sensor 731 and the second motion sensor 732 may detect the rotation amount of the shaft 511 of the hinge structure 510 or may recognize that the folding angle is 180 degrees by interacting with each other and may transmit the same to the processor 120. Hereinafter, in response to the signal transmitted by the processor 120, the first haptic actuator 610 may perform a first operation and the second haptic actuator 620 may perform the first operation. The description of the first operation in FIG. 9 may be applicable to that of the first operation.

According to certain embodiments, when the second housing structure 320 is in the intermediate state A relative to the first housing structure 310 (e.g., 0<A<180 degrees), the first motion sensor 731 or the second motion sensor 732 may detect the rotation amount of the shaft 511 of the hinge structure 510 or may recognize that the folding angle exceeds 0 degrees and is less than 180 degrees by interacting with each other and may transmit the same to the processor 120. Hereinafter, in response to the signal transmitted by the processor 120, the first haptic actuator 610 may perform a first operation and the second haptic actuator 620 may perform a third operation. For example, the first motion sensor 731 may transmit a first motion signal M1 to the actuator controller 122 within the processor 120. The actuator controller 122 may control the first haptic actuator 610 to perform a first operation on the basis of an instruction stored in the memory. The second motion sensor 732 may transmit a second motion signal M2 to the actuator controller 122 within the processor 120. The actuator controller 122 may control the second haptic actuator 620 to perform a third operation on the basis of an instruction stored in the memory. The processor 120 may transmit a shifted phase signal corresponding to the angle change to the second haptic actuator 620, and the second haptic actuator 620 may output a vibration in response to the signal. The description of the third operation in FIGS. 13 and 14 may be applicable to that of the third operation.

Table 2 below represents the operation according to other operations of the haptic actuators depending on folding angles.

TABLE 2

| Folding Angle [Degree] | 1st Housing Structure (1st Actuator) | 2nd Housing Structure (2nd Actuator) |
| --- | --- | --- |
| 0 Degree (Minimum Limit) | first operation | second operatiom |
| 0 < A < 90 (Acute Angle) | Convergent Haptic Control (third operation) | Convergent Haptic Control (third operation) |

TABLE 2-continued

| Folding Angle [Degree] | 1st Housing Structure (1st Actuator) | 2nd Housing Structure (2nd Actuator) |
| --- | --- | --- |
| 90 ≤ A < 180 (Obtuse Angle) | Convergent Haptic Control (third operation) | Convergent Haptic Control (third operation) |
| 180 Degree (Maximum Limit) | first operation | first operation |

According to certain embodiments, depending on the rotary angle of the second housing structure 320 relative to the first housing structure 310, such as 0 degrees, 180 degrees, an angle greater than 0 degrees and less than 90 degrees (e.g., an acute angle), or an angle greater angle 90 degrees and less than 180 degrees (e.g., an obtuse angle), the first haptic actuator 610 and the second haptic actuator 620 may perform different operations.

According to certain embodiments, in the state in which the second housing 320 is folded relative to the first housing structure 310 (e.g., 0 degrees), the first haptic actuator 610 may perform a first operation, and the second haptic actuator 620 may perform a second operation. The description of the first operation and the second operation of FIGS. 9 and 10 may be applicable to the first operation and the second operation. According to an embodiment, in the state in which the second housing 320 is unfolded relative to the first housing structure 310 (e.g., 180 degrees), the first haptic actuator 610 may perform a first operation, and the second haptic actuator 620 may perform the first operation. The description of the first operation in FIG. 9 may be applicable to that of the first operation.

According to an embodiment, when the second housing structure 320 is in the intermediate state relative to the first housing (e.g., an acute angle or an obtuse angle), the first haptic actuator 610 and the second haptic actuator 620 may output a vibration having a phase capable of being shifted depending on the relative rotation angle. This may be defined as a convergent haptic control mode, a change in position of respective housing structure relative to each other may be detected, and the processor may transmit a signal corresponding thereto to the first haptic actuator 610 and the second haptic actuator 620.

Figure 19:
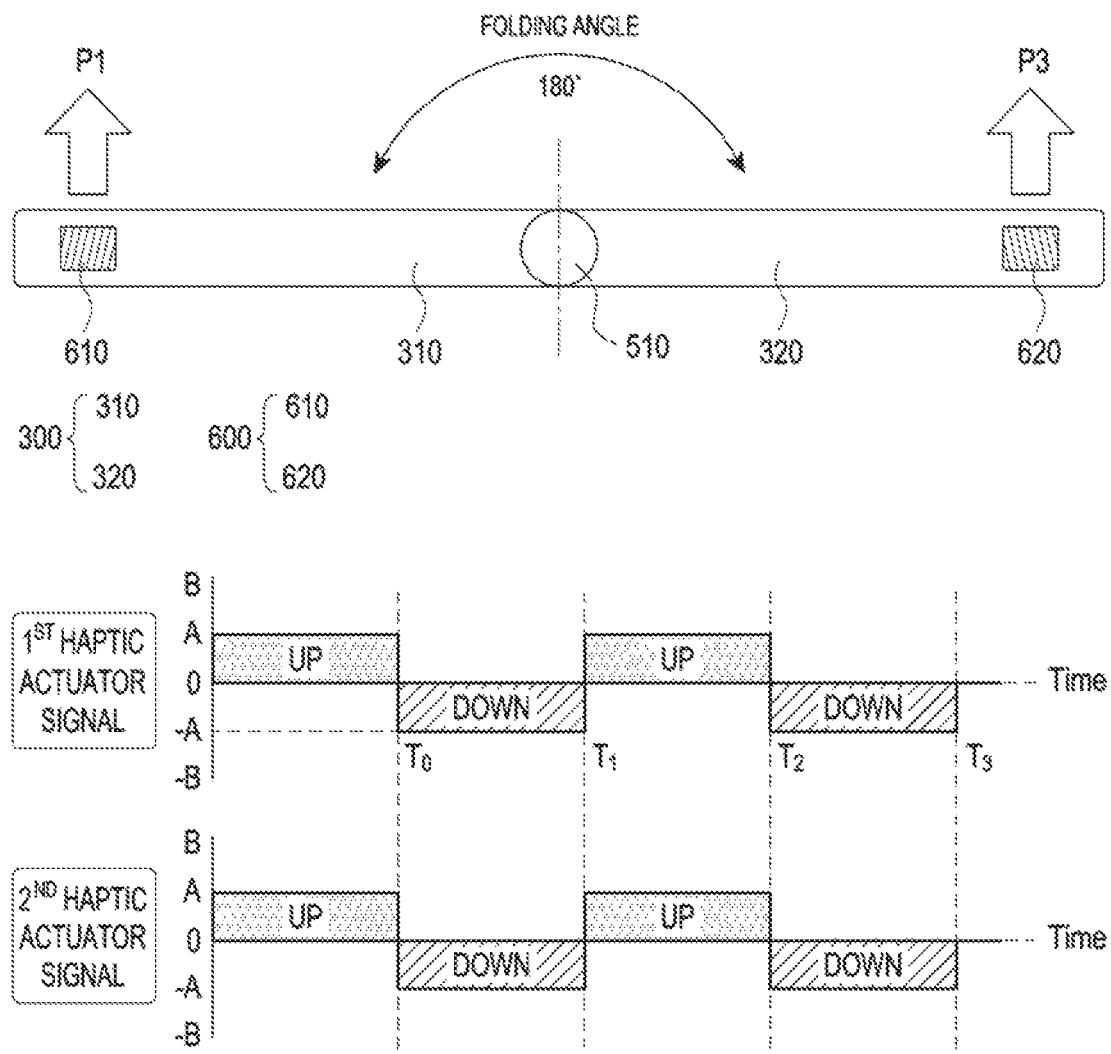
FIG. 19 is a cross-sectional view schematically illustrating the state in which an electronic device according to certain embodiments is unfolded.
Figure 20:
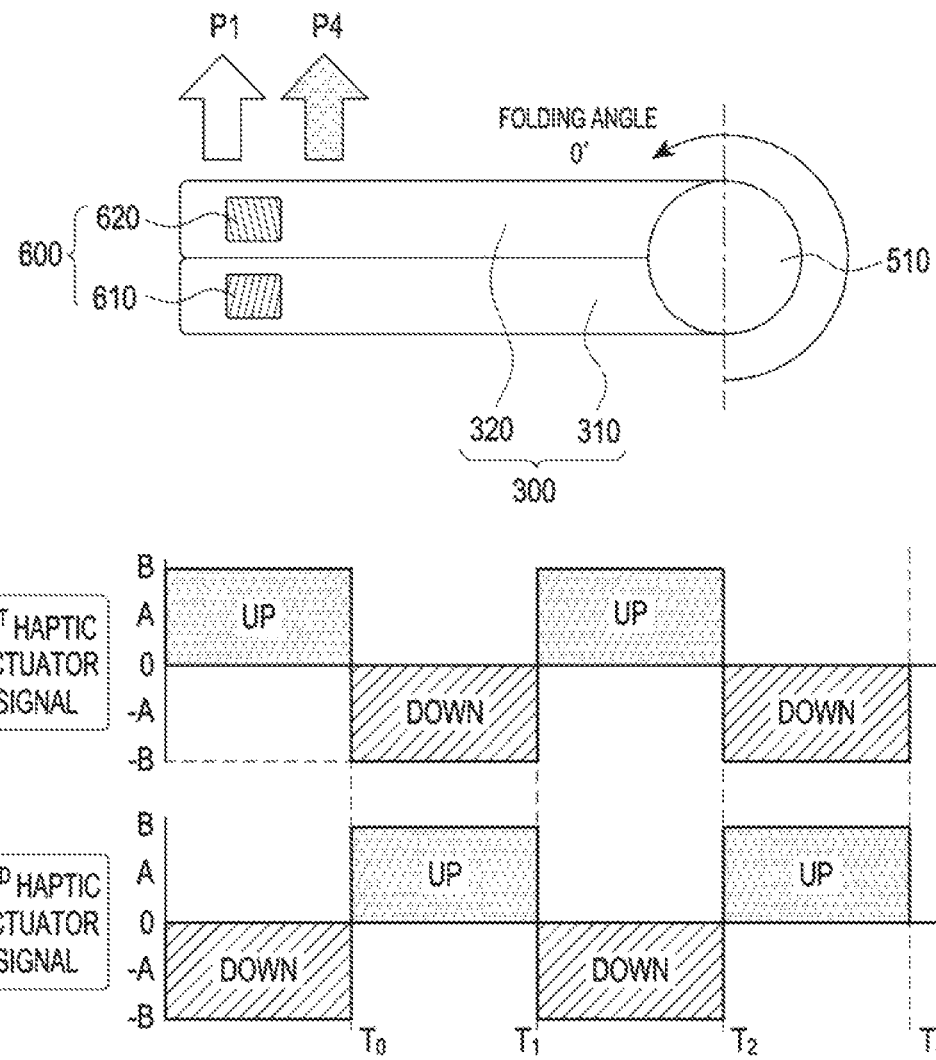
FIG. 20 is a cross-sectional view schematically illustrating the state in which the electronic device of FIG. 19 is folded.

FIGS. 19 and 20 illustrate an electronic device where the intensity of the actuator signal changes based on whether the electronic device 101 is in the unfolded state (FIG. 19) or the folded state (FIG. 20). In the unfolded state, the magnitude of the actuator signals is A and the signals are in phase. In the folded state, the actuator signals have a higher magnitude B, and the signals are 180 degrees out of phase.

FIG. 19 is a cross-sectional view schematically illustrating the state in which an electronic device according to certain embodiments is unfolded; FIG. 20 is a cross-sectional view schematically illustrating the state in which the electronic device of FIG. 19 is folded.

Referring to FIGS. 19 and 20, in certain embodiments, the electronic device 101 may include a first housing structure 310, a second housing structure 320, a hinge structure 510, and a plurality of haptic actuators 600. The first housing structure 310, the second housing structure 320, the hinge structure 510, and the plurality of haptic actuators 600 in FIGS. 19 and 20 may be partially or entirely the same in configuration as the first housing structure 310, the second housing structure 320, the hinge structure 510, and the plurality of haptic actuators 600 in FIG. 6.

FIG. 19 illustrates the unfolded state, and FIG. 20 illustrates the folded state.

Referring to FIGS. 19 and 20, a first haptic actuator 610 may be disposed in the first housing structure 310, and a second haptic actuator 620 may be disposed in the second housing structure 320. The first haptic actuator 610 and the second haptic actuator 620 may be implemented as a dual type having the same vibration form (e.g., up and down vibration). The first haptic actuator 610 and the second haptic actuator 620 may operate in a fifth control mode.

Referring to FIG. 19, in the state in which the foldable housing 300 is in a tablet mode (e.g., the unfolded state or the intermediate state), the first haptic actuator 610 and the second haptic actuator 620 may perform a first operation. For example, the first haptic actuator 610 and the second haptic actuator 620 may provide a vibration having intensity A. The description of the first operation in FIG. 9 may be applicable to that of the first operation.

Referring to FIG. 20, the first haptic actuator 610 and the second haptic actuator 620 may provide an output via vibration intensity differential control as well as phase differential control based on a tablet mode/a mobile mode according to the sixth control mode. The first haptic actuator 610 may perform a fourth operation and the second haptic actuator 620 may perform a fifth operation.

According to an embodiment, the processor may provide a fourth haptic signal to the first haptic actuator 610. As illustrated in the top graph in FIG. 20, in the fourth haptic signal, up and down signals may be alternately generated as time passes. The first haptic actuator 610 receiving the fourth haptic signal may output a vibration of a predetermined phase oriented in the first direction P1 of the first housing structure 310.

According to an embodiment, the processor may provide a fifth haptic signal to the second haptic actuator 620. As illustrated in the bottom graph in FIG. 20, in the fifth haptic signal, down and up signals may be alternately generated as time passes in a phase opposite that of the fourth haptic signal. The second haptic actuator 620 receiving the fifth haptic signal may output a vibration of a predetermined phase oriented in the fourth direction P4 of the second housing structure 320.

According to an embodiment, the fourth haptic signal and the fifth haptic signal may transmit, to an actuator, a signal having strong intensity compared to the first haptic signal and the second haptic signal. For example, in the interval of 0 to $T_0$, the fourth haptic signal may transmit a signal having intensity B, which is twice intensity A, to the first haptic actuator 610, and the first haptic actuator 610 may provide a vibration stronger than (about twice) that in the unfolded state of the foldable housing in the first direction P1. The fifth haptic signal may transmit a signal having intensity B, which is twice intensity A, to the second haptic actuator 620, and the second haptic actuator 620 may provide a vibration stronger than (about twice) that in the unfolded state in the fourth direction P4. As another example, in the interval of T0 to T1, the first haptic actuator 610 may output a vibration having intensity B, and the second haptic actuator 620 may output a vibration having intensity B.

According to an embodiment, depending on the folded state/unfolded state, the electronic device may vary in weight per unit area vibrated by the first haptic actuator 610 and the second haptic actuator 620. For example, in the folded state, the weight per unit area may increase (about twice) depending on the stacked arrangement structure of the first housing structure 310 and the second housing structure 320. Since the first housing structure 310 and the second housing structure 320 are separated from each other in the unfolded state, the weight per unit area may be reduced compared to that in the folded state. According to an embodiment, since the electronic device differentially controls the vibration intensity of the first haptic actuator 610 and the second haptic actuator 620 depending on the folded state/unfolded state, the user is capable of being provided with equalized haptic feedback even in the folded state/unfolded state.

Figure 21:
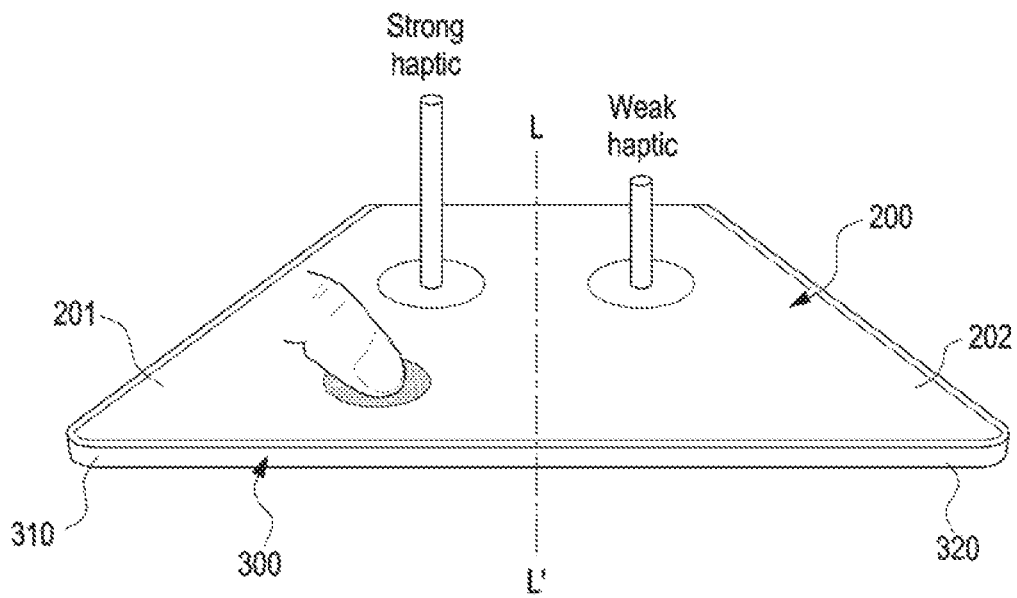
FIG. 21 is a cross-sectional view schematically illustrating an electronic device according to another exemplary embodiment in order to explain the operation of a haptic actuator depending on the presence/absence of a touch input.
Figure 22:
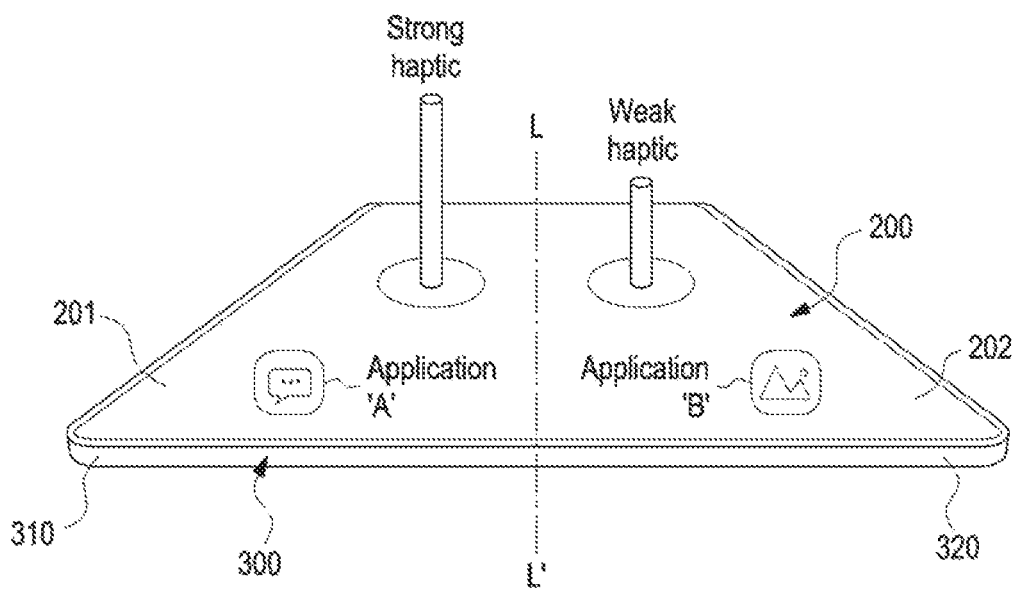
FIG. 22 is a cross-sectional view schematically illustrating an electronic device according to still another exemplary embodiment in order to explain the operation of a haptic actuator depending on the presence/absence of execution of an application.

In FIGS. 21 and 22, when the device is in the unfolded state, the haptic actuator in the first housing 310 and the haptic actuator in the second housing 320 have varying intensities based on the application that is displayed on the respective housing.

FIG. 21 is a cross-sectional view schematically illustrating an electronic device according to another exemplary embodiment in order to explain the operation of a haptic actuator depending on the presence/absence of a touch input.

Referring to FIG. 21, in certain embodiments, the electronic device 101 may include a first housing structure 310, a second housing structure 320, a flexible display 200, a hinge structure 510, and a plurality of haptic actuators 600. The first housing structure 310, the second housing structure 320, the flexible display 200, the hinge structure 510, and the plurality of haptic actuators 600 in FIG. 21 may be partially or entirely the same in configuration as the first housing structure 310, the second housing structure 320, the flexible display 200, the hinge structure 510, and the plurality of haptic actuators 600 in FIGS. 1 to 6.

FIG. 21 illustrates the unfolded state. Referring to FIG. 21, a first haptic actuator 610 may be disposed in the first housing structure 310, and a second haptic actuator 620 may be disposed in the second housing structure 320. The first haptic actuator 610 and the second haptic actuator 620 may be implemented as a dual type having the same vibration form (e.g., up and down vibration).

According to certain embodiments, the active area of the flexible display 200 may be separated into a first area 201 and a second area 202 with reference to the folding line L-L' on which the hinge structure is mounted. The electronic device may differentially control the first haptic actuator 610 and the second haptic actuator 620 depending on the presence/absence of a touch input in any one of the first area 201 and the second area 202.

Table 3 below represents operations according to a seventh control mode of the first haptic actuator 610 and the second haptic actuator 620 depending on rotary angles.

TABLE 3

| Folding Angle [Degree] | 1st Housing Structure (Left Half Portion) | | 2nd Housing Structure (Right Half Portion) | |
|---|---|---|---|---|
| | 1st Actuator | Presence/Absence of Touch | 2nd Actuator | Presence/Absence of Touch |
| 0 Degree | Strong Haptic | Touch | Strong Haptic | Don't Care |
| 0 Degree | Strong Haptic | Don't Care | Strong Haptic | Touch |
| 0 < A ≤ 180 | Strong Haptic | Touch | Weak Haptic | Non-Touch |
| 0 < A ≤ 180 | Weak Haptic | Non-Touch | Strong Haptic | Touch |
| 0 < A ≤ 180 | Strong Haptic | Touch | Strong Haptic | Touch |

According to certain embodiments, when the first area 201 is provided with a stronger touch input compared with the second area 202 in the state in which the folding angle of the second housing structure 320 relative to the first housing structure 310 is greater than 0 degrees and equal to or less than 180 degree, the processor may control whether to activate the first haptic actuator 610 and the second haptic actuator 620 connected to the first area 201. For example, on the basis of the instructions stored in the memory, the processor in the electronic device controls the first haptic actuator 610 to perform a $(7-1)^{th}$ operation through strong haptic control and controls the second haptic actuator 620 to perform a $(7-2)^{th}$ operation through relatively weak haptic control.

According to certain embodiments, when the second area 202 is provided with a stronger touch input compared with the first area 201 in the state in which the folding angle of the second housing structure 320 relative to the first housing structure 310 is greater than 0 degrees and equal to or less than 180 degree, the processor may control whether to activate the first haptic actuator 610 and the second haptic actuator 620 connected to the first area 201. For example, on the basis of the instructions stored in the memory, the processor in the electronic device controls the second haptic actuator 620 to perform the $(7-1)^{th}$ operation through strong haptic control and controls the first haptic actuator 610 to perform the $(7-2)^{th}$ operation through relatively weak haptic control.

According to certain embodiments, when the first area 201 and the second area 202 are provided with a touch input having intensity equal to or higher than a predetermined level in the state in which the folding angle of the second housing structure 320 relative to the first housing structure 310 is greater than 0 degrees and equal to or less than 180 degrees, the processor may control whether to activate the first haptic actuator 610 and the second haptic actuator 620 connected to the first area 201. For example, on the basis of the instructions stored in the memory, the processor in the electronic device controls the first haptic actuator 610 to perform the $(7-1)^{th}$ operation through strong haptic control and controls the second haptic actuator 620 to perform a $(7-1)^{th}$ operation through strong haptic control.

According to certain embodiments, in the state in which the folding angle of the second housing 320 relative to the first housing structure 310 is 0 degrees, the first haptic actuator 610 or the second haptic actuator 620 may perform the $(7-1)^{th}$ operation. For example, due to the increased weight per unit area of the housing structures in the state in which the folding angle of the second housing structure 320 relative to the first housing structure 320 is 0 degrees, control may be performed at the maximum vibration intensity regardless of the touch area.

FIG. 22 is a cross-sectional view schematically illustrating an electronic device according to still another exemplary embodiment in order to explain the operation of a haptic actuator depending on the presence/absence of execution of an application.

Referring to FIG. 22, in certain embodiments, the electronic device 101 may include a first housing structure 310, a second housing structure 320, a flexible display 200, a hinge structure 510, and a plurality of haptic actuators 600. The first housing structure 310, the second housing structure 320, the flexible display 200, the hinge structure 510, and the plurality of haptic actuators 600 in FIG. 22 may be partially or entirely the same in configuration as the first housing structure 310, the second housing structure 320, the flexible display 200, the hinge structure 510, and the plurality of haptic actuators 600 in FIGS. 1 to 6.

FIG. 22 illustrates the unfolded state. Referring to FIG. 22, a first haptic actuator 610 may be disposed in the first housing structure 310, and a second haptic actuator 620 may be disposed in the second housing structure 320. The first haptic actuator 610 and the second haptic actuator 620 may be implemented as a dual type having the same vibration form (e.g., up and down vibration).

According to certain embodiments, the active area of the flexible display may be separated into a first area 201 and a second area 202 with reference to the folding line L-L' on which the hinge structure is mounted. The first area 201 and the second area 202 may provide split windows. For example, the electronic device may support multitasking for executing different applications in the first area 201 and the second area 202. When different applications are executed in the first area 201 and the second area 202, the electronic device may differentially control the first haptic actuator 610 and the second haptic actuator 620.

Table 4 below represents operations of the haptic actuators according to an eighth control mode in split areas of a flexible display.

TABLE 4

| Use Case | 1$^{st}$ Housing Structure (Left Half Portion) | | 2$^{nd}$ Housing Structure (Right Half Portion) | |
| --- | --- | --- | --- | --- |
| | 1$^{st}$ Actuator | APP. A (Window#1) | 2$^{nd}$ Actuator | APP. B (Window#2) |
| Case#1 | Strong Haptic | Receiving Messages | Weak Haptic | No Message |
| Case#2 | Low Frequency Haptic | No Alarm | High Frequency Haptic | Alarm |
| Case#3 | Weak Haptic | Relatively Narrow Window | Strong Haptic | Relatively Wide Window |
| Case#4 | Non-Haptic | De-Activation for Half Window | Strong Haptic | Activation for Half Window |
| Case#5 | Variable | Movable/ Sizable Window | Fixed Haptic | Fixed Window |
| Case#6 | Strong Haptic | Notification in Sleep Mode | Strong Haptic | Notification in Sleep Mode |

According to certain embodiments, Case 1 represents a case in which a message is received in the first area 201 and thus an application related to the message is executed, but no message is received in the second region 202 and thus a message-related application is not executed. The processor may control the first haptic actuator 610 connected to the first area 201 to perform a $(8-1)^{th}$ operation, and may control the second haptic actuator 620 connected to the second area 202 to perform a $(8-2)^{th}$ operation. For example, on the basis of the instructions stored in the memory, the processor in the electronic device controls the first haptic actuator 610 to perform a $(8-1)^{th}$ operation through strong haptic control and controls the second haptic actuator 620 to perform a $(8-2)^{th}$ operation through relatively weak haptic control. The $(8-1)^{th}$ operation of the first haptic actuator 610 may output a vibration having relatively stronger intensity compared to the $(8-2)^{th}$ operation.

According to certain embodiments, Case 2 represents a case in which an alarm-related application is executed in the second area 202, but an alarm-related application is not executed in the first area 201. The processor may control the second haptic actuator 620 connected to the second area 202 to perform a $(8-3)^{th}$ operation, and may control the first haptic actuator 610 connected to the first area 201 to perform a $(8-4)^{th}$ operation. For example, on the basis of the instructions stored in the memory, the processor in the electronic device controls the second haptic actuator 620 to perform the $(8-3)^{th}$ operation through strong frequency haptic control and controls the first haptic actuator 610 to perform the $(8-4)^{th}$ operation through relatively low frequency haptic control.

According to certain embodiments, Case 3 represents a case in which a screen using a relatively large window is provided in the second area 202 compared with the first area. The processor may control the second haptic actuator 620 connected to the second area 202 to perform the (8-1)$^{th}$ operation, and may control the first haptic actuator 610 connected to the first area 201 to perform the (8-2)$^{th}$ operation. For example, on the basis of the instructions stored in the memory, the processor in the electronic device controls the second haptic actuator 620 to perform the (8-1)$^{th}$ operation through strong haptic control and controls the first haptic actuator 610 to perform the (8-2)$^{th}$ operation through relatively weak haptic control. The (8-1)$^{th}$ operation of the second haptic actuator 620 may output a vibration having relatively stronger intensity compared to the (8-2)$^{th}$ operation.

According to certain embodiments, Case 4 represents a case in which an application using a window is executed only in the second area 202. The processor may control the second haptic actuator 620 connected to the second area 202 to perform the (8-1)$^{th}$ operation and may control the first haptic actuator 610 connected to the first area 201 not to perform an operation. For example, on the basis of the instructions stored in the memory, the processor in the electronic device controls the second haptic actuator 620 to perform the (8-1)$^{th}$ operation through strong haptic control and controls the first haptic actuator 610 not to perform an operation.

According to certain embodiments, Case 5 represents a case in which an application using a window having a fixed size is executed in the second area 202, but an application using a window requiring size variation is executed in the first area 201. The processor may control the second haptic actuator 620 connected to the second area 202 to perform the (8-5)$^{th}$ operation, and may control the first haptic actuator 610 connected to the first area 201 to perform the (8-6)$^{th}$ operation. For example, on the basis of the instructions stored in the memory, the processor in the electronic device may control the second haptic actuator 620 to perform the (8-5)$^{th}$ operation through haptic (e.g., fixed haptic) control of at least one of a predetermined frequency, signal intensity, and a signal phase. The processor in the electronic device may control the first haptic actuator 610 to perform the (8-6)$^{th}$ operation through haptic (e.g., variable haptic) control of at least one of a variable frequency, signal intensity, and a signal phase.

According to certain embodiments, Case 6 represents a case in which predetermined mode notification (e.g., notification in sleep mode) is executed in each of the first area 201 and the second area 202. The processor may control the first haptic actuator 610 connected to the first area 201 to perform the (8-1)$^{th}$ operation and may control the second haptic actuator 620 connected to the second area 202 to perform the (8-1)$^{th}$ operation. For example, on the basis of the instructions stored in the memory, the processor in the electronic device may control the first haptic actuator 610 and the second haptic actuator 620 to perform the (8-1)$^{th}$ operation through strong haptic control.

An electronic device (e.g., the electronic device 101 in FIG. 1) according to certain embodiments may include a foldable housing (e.g., the foldable housing 300 in FIG. 6), a flexible display (e.g., the flexible display 200 in FIG. 6), at least one sensor (e.g., the at least one sensor 700 in FIG. 6), a first haptic actuator (e.g., the first haptic actuator 610 in FIG. 6), a second haptic actuator (e.g., the second haptic actuator 620 in FIG. 6), a processor (e.g., the processor 120 in FIG. 1), and memory (e.g., the memory 130 in FIG. 1). The foldable housing may include: a hinge structure (the hinge structure 510 in FIG. 6); a first housing structure (e.g., the first housing structure 310 in FIG. 6) connected to the hinge structure and including a first face (e.g., the first face 311 in FIG. 6) oriented in a first direction (e.g., the first direction P1 in FIG. 6), and a second face (e.g., the second face 312 in FIG. 6) oriented in a second direction (e.g., the second direction P2 in FIG. 6) opposite the first direction; and a second housing structure (e.g., the second housing structure 320 in FIG. 6) connected to the hinge structure and including a third face (e.g., the third face 321 in FIG. 6) oriented in a third direction (e.g., the third direction P3 in FIG. 6), and a fourth face (e.g., the fourth face 322 in FIG. 6) oriented in a fourth direction (e.g., the fourth direction P4 in FIG. 6) opposite the third direction, the second housing structure being configured to be folded about the hinge structure relative to the first housing structure. The flexible display may extend over the first face and over the third face. The at least one sensor may be disposed within the foldable housing, and may be configured to detect the folding state of the foldable housing. The first haptic actuator may be disposed within the first housing structure, and the second haptic actuator may be disposed within the second housing structure. The processor may be disposed within the first housing structure or the second housing structure, and may be operatively connected to the display, the at least one sensor, the first haptic actuator, and the second haptic actuator, and the memory may be operatively connected to the processor. The memory may store instructions that, when executed, cause the processor to detect the folding state of the foldable housing using the at least one sensor and to independently control the first haptic actuator and the second haptic actuator on the basis of at least part of the detected folding state.

According to certain embodiments, the instructions may cause the processor to differently control the first haptic actuator and the second haptic actuator in the same manner when the folding state of the foldable housing is not in the unfolded state.

According to certain embodiments, the processor may be configured to differently control the first haptic actuator and the second haptic actuator when the folding state of the foldable housing is in the folded state such that a vibration output from the first haptic actuator and a vibration output from the second haptic actuator are opposite each other in phase.

According to certain embodiments, the processor may be configured to cause the second haptic actuator to output a phase-shifted vibration compared with the first haptic actuator in response to an operation in which the foldable housing is changed from the folded state to the unfolded state.

According to certain embodiments, the instructions may cause the processor to control the first haptic actuator and the second haptic actuator in the same manner when the folding state of the foldable housing is not in the folded state.

According to certain embodiments, the instructions are configured to cause the processor to control the first haptic actuator and the second haptic actuator by controlling a frequency, signal intensity, a signal phase, and/or whether to activate a signal.

According to certain embodiments, the at least one sensor may include an angle sensor (e.g., the rotary angle sensor 720 in FIGS. 15 and 16) connected to the hinge structure so as to detect a position of the third face relative to the first face.

According to certain embodiments, the at least one sensor may include a proximity sensor (e.g., the hall sensor 710 in FIGS. 11 and 12) disposed in the first housing structure or the second housing structure.

According to certain embodiments, the first haptic actuator and the second haptic actuator may be disposed to be spaced apart from each other at a corresponding interval with the hinge structure interposed therebetween when the foldable housing is in the unfolded state, and the first haptic actuator and the second haptic actuator may be disposed to face each other when the foldable housing is in the folded state.

An electronic device (e.g., the electronic device 101 in FIG. 1) according to certain embodiments may include: a foldable housing (e.g., the foldable housing 300 in FIG. 6) including a hinge structure (e.g., the hinge structure 510 in FIG. 6), a first housing structure (e.g., the first housing structure 310 in FIG. 6) connected to the hinge structure, and a second housing structure (e.g., the second housing structure 320 in FIG. 6) connected to the hinge structure, the second housing structure being configured to be rotatable about the hinge structure relative to the first housing structure; a flexible display (e.g., the flexible display 200 in FIG. 6) disposed to extend from the first housing structure to the second housing structure; at least one sensor (e.g., the at least one sensor 700 in FIG. 6) disposed within the foldable housing and configured to detect rotation of the second housing structure relative to the first housing structure; a first haptic actuator (e.g., the first haptic actuator 610 in FIG. 6) disposed within the first housing structure; a second haptic actuator (e.g., the second haptic actuator in FIG. 6) disposed within the second housing structure; a processor (e.g., the processor 120 in FIG. 1) disposed within the first housing structure or the second housing structure, and operatively connected to the display, the at least one sensor, the first haptic actuator, and the second haptic actuator; and a memory operatively connected to the processor.

According to certain embodiments, the memory may store instructions that, when executed, cause the processor to perform control such that, when a folding state of the foldable housing is not in a folded state, the first haptic actuator may receive a first haptic signal from the processor and perform a first operation and the second haptic actuator may receive a second haptic signal from the processor and perform a second operation. When the folding state of the foldable housing is in the folded state, the first haptic actuator may receive a third haptic signal from the processor and may perform a third operation, the second haptic actuator may receive a fourth haptic signal from the processor and may perform a fourth operation, and the first haptic signal and the third haptic signal are identical to each other.

According to certain embodiments, the first haptic signal and the second haptic signal may be identical to each other, and the third haptic signal and the fourth haptic signal may be opposite each other in phase.

According to certain embodiments, the memory stores instructions that, when executed, cause the processor to perform control such that: the third haptic signal provides a signal having stronger intensity than the first haptic signal, and the fourth haptic signal provides a signal having stronger intensity than the second haptic signal, and the third haptic signal and the fourth haptic signal may be opposite each other in phase.

According to certain embodiments, the memory may store instructions that, when executed, cause the processor to perform control such that: in an operation of changing the foldable housing from the folded state to the unfolded state, the second haptic signal provides a signal phase-shifted with respect to the first haptic signal in response to the rotation.

According to certain embodiments, the flexible display may have an active area, which includes a first area corresponding to the first housing structure and a second area corresponding to the second housing structure. The memory may store instructions that, when executed, cause the processor to differentially control the first haptic actuator and the second haptic actuator depending on presence/absence of a touch input in any one of the first area and the second area.

According to certain embodiments, the flexible display may have an active area, which includes a first area corresponding to the first housing structure and a second area corresponding to the second housing structure. The memory may store instructions that, when executed, cause the processor to differentially control the first haptic actuator and the second haptic actuator depending on a type of an application executed in any one of the first area and the second area.

According to certain embodiments, the first haptic actuator and the second haptic actuator may be disposed to be spaced apart from each other at a corresponding interval with the hinge structure interposed therebetween when the foldable housing is in the unfolded state, and the first haptic actuator and the second haptic actuator may be disposed to face each other when the foldable housing is in the folded state.

An electronic device (e.g., the electronic device 101 in FIG. 1) according to certain embodiments may include a foldable housing (e.g., the foldable housing 300 in FIG. 6), a first display (e.g., the display 200 in FIG. 6), a second display (e.g., the sub-display in FIG. 2), at least one sensor (e.g., the at least one sensor 700 in FIG. 6), a first haptic actuator (e.g., the first haptic actuator 610 in FIG. 6), a second haptic actuator (e.g., the second haptic actuator 620 in FIG. 6), a processor (e.g., the processor 120 in FIG. 1), and memory (e.g., the memory 130 in FIG. 1). The foldable housing may include: a hinge structure (the hinge structure 510 in FIG. 6); a first housing structure (e.g., the first housing structure 310 in FIG. 6) connected to the hinge structure and including a first face (e.g., the first face 311 in FIG. 6) oriented in a first direction (e.g., the first direction P1 in FIG. 6), and a second face (e.g., the second face 312 in FIG. 6) oriented in a second direction (e.g., the second direction P2 in FIG. 6) opposite the first direction; and a second housing structure (e.g., the second housing structure 320 in FIG. 6) connected to the hinge structure and including a third face (e.g., the third face 321 in FIG. 6) oriented in a third direction (e.g., the third direction P3 in FIG. 6), and a fourth face (e.g., the fourth face 322 in FIG. 6) oriented in a fourth direction (e.g., the fourth direction P4 in FIG. 6) opposite the third direction, the second housing structure being configured to be folded about the hinge structure relative to the first housing structure. The first display may be disposed on the first face, and the second display may be disposed on the third face. The at least one sensor may be disposed within the foldable housing, and may be configured to detect a folding state of the foldable housing. The first haptic actuator may be disposed within the first housing structure, and the second haptic actuator may be disposed within the second housing structure. The processor may be disposed within the first housing structure or the second housing structure and may be operatively connected to the display, the at least one sensor, the first haptic actuator, and the second haptic actuator, and the memory may be operatively connected to the processor. The memory may store instructions that, when executed, cause the processor to detect a folding state of the foldable housing using the at least one sensor and to independently control the first haptic actuator and the second haptic actuator on the basis of at least part of the detected folded state.

According to certain embodiments, the instructions cause the processor to differently control the first haptic actuator and the second haptic actuator when the foldable housing is not in the unfolded state.

According to certain embodiments, the instructions cause the processor to control the first haptic actuator and the second haptic actuator in the same manner when the foldable housing is not in the folded state.

According to certain embodiments, an electronic device comprises a foldable housing including: a hinge structure, a first housing structure connected to the hinge structure, and including a first face and a second face opposite the first face, and a second housing structure connected to the hinge structure and including a third face and a fourth face opposite the third face, the second housing structure being configured to be rotated about the hinge structure; a flexible display extending over the first face and over the third face; at least one sensor disposed within the foldable housing, and configured to sense an angle formed between the first face and the third face; a first haptic actuator disposed within the first housing structure; a second haptic actuator disposed within the second housing structure; at least one processor disposed within the first housing structure or the second housing structure, and operatively connected to the flexible display, the at least one sensor, the first haptic actuator, and the second haptic actuator configured to cause the at least one processor to control the first haptic actuator to perform a same or different action than and the second haptic actuator based on whether a deviation of the angle from flat is more than a threshold.

According to certain embodiments, the at least one processor controls the first haptic actuator and the second haptic actuator differently when the deviation exceeds the threshold.

According to certain embodiments, the at least one processor controls the first haptic actuator and the second haptic actuator that a vibration output from the first haptic actuator and a vibration output from the second haptic actuator are opposite each other in phase when the deviation exceeds the threshold.

According to certain embodiments, the at least one processor controls the second haptic actuator to output a phase-shifted vibration compared with the first haptic actuator when the deviation changes from exceeding the threshold to within the threshold.

According to certain embodiments, the at least one processor controls the first haptic actuator and the second haptic actuator to perform the same action when the deviation is within the threshold.

According to certain embodiments, the at least one processor controls the first haptic actuator and the second haptic actuator by controlling a frequency, signal intensity, a signal phase, or whether to activate a signal.

According to certain embodiments, the at least one sensor includes an angle sensor connected to the hinge structure so as to sense a position of the third face relative to the first face.

According to certain embodiments, the at least one sensor includes a proximity sensor disposed in the first housing structure or the second housing structure.

According to certain embodiments, the first haptic actuator and the second haptic actuator are configured to be spaced apart from each other with the hinge structure between the first actuator and the second actuator when the deviation is within the threshold, and the first haptic actuator and the second haptic actuator are configured to face each other when the deviation exceeds the threshold.

According to certain embodiments, an electronic device comprises a foldable housing including a hinge structure, a first housing structure connected to the hinge structure, and a second housing structure connected to the hinge structure, the second housing structure being configured to be rotatable about the hinge structure relative to the first housing structure; a flexible display disposed to extend from the first housing structure to the second housing structure; at least one sensor disposed within the foldable housing and configured to detect rotation of the second housing structure relative to the first housing structure; a first haptic actuator disposed within the first housing structure; a second haptic actuator disposed within the second housing structure; a processor disposed within the first housing structure or the second housing structure, and operatively connected to the display, the at least one sensor, the first haptic actuator, and the second haptic actuator; and a memory operatively connected to the processor.

According to certain embodiments, the memory stores instructions that, when executed, cause the processor to perform control such that: when a deviation of an angle formed by the first housing structure and the second housing structure from flat is within a threshold, the first haptic actuator receives a first haptic signal from the at least one processor and performs a first operation and the second haptic actuator receives a second haptic signal from the at least one processor and performs a second operation, and when the deviation exceeds the threshold, the first haptic actuator receives a third haptic signal from the processor and performs a third operation and the second haptic actuator receives a fourth haptic signal from the processor and performs a fourth operation, and the first haptic signal and the third haptic signal are the same.

According to certain embodiments, the first haptic signal and the second haptic signal are the same, and the third haptic signal and the fourth haptic signal are opposite each other in phase.

According to certain embodiments, the memory stores instructions that, when executed, cause the at least one processor to perform control such that: the third haptic signal provides a signal having stronger intensity than the first haptic signal, and the fourth haptic signal provides a signal having stronger intensity than the second haptic signal, and wherein the third haptic signal and the fourth haptic signal are opposite each other in phase.

According to certain embodiments, the second haptic signal provides a signal phase-shifted with respect to the first haptic signal in response to the rotation changing the deviation from exceeding the threshold to within the threshold.

According to certain embodiments, the flexible display includes an active area, which includes a first area corresponding to the first housing structure and a second area corresponding to the second housing structure, and the memory stores instructions that, when executed, are cause the at least one processor to differentially control the first haptic actuator and the second haptic actuator depending on presence/absence of a touch input in any one of the first area and the second area.

According to certain embodiments, the flexible display includes an active area, which includes a first area corresponding to the first housing structure and a second area corresponding to the second housing structure, and the memory stores instructions that, when executed, are configured to cause the processor to differentially control the first haptic actuator and the second haptic actuator depending on a type of an application executed in any one of the first area and the second area.

According to certain embodiments, the first haptic actuator and the second haptic actuator are configured to be spaced apart from each other with the hinge structure interposed therebetween when the deviation is within the threshold, and the first haptic actuator and the second haptic actuator are disposed to face each other when the deviation exceeds the threshold.

According to certain embodiments, an electronic device comprises a foldable housing including: a hinge structure, a first housing structure connected to the hinge structure, and including a first face and a second face opposite the first face, and a second housing structure connected to the hinge structure, and including a third face and a fourth face opposite the third face; a first display positioned on the first face; a second display positioned on the third face; at least one sensor disposed within the foldable housing, and configured to detect a folding state of the foldable housing; a first haptic actuator disposed within the first housing structure; a second haptic actuator disposed within the first housing structure; at least one processor disposed within the first housing structure or the second housing structure, and operatively connected to the display, the at least one sensor, the first haptic actuator, and the second haptic actuator; and a memory operatively connected to the processor, wherein the memory stores instructions that, when executed, cause the at least one processor to detect a folding state of the foldable housing using the at least one sensor, and to independently control the first haptic actuator and the second haptic actuator based on at least part of the detected folded state.

According to certain embodiments, the instructions cause the at least one processor to differently control the first haptic actuator and the second haptic actuator when the foldable housing is not in an unfolded state.

According to certain embodiments, the instructions cause the at least one processor to control the first haptic actuator and the second haptic actuator in a same manner when the foldable housing is not in the folded state.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. An electronic device comprising:
   a foldable housing including:
   a hinge structure,
   a first housing structure connected to the hinge structure, and including a first face and a second face opposite the first face, and
   a second housing structure connected to the hinge structure and including a third face and a fourth face opposite the third face, the second housing structure being configured to be rotated about the hinge structure;
   a flexible display extending over the first face and over the third face;
   at least one sensor disposed within the foldable housing, and configured to sense an angle formed between the first face and the third face;
   a first haptic actuator disposed within the first housing structure;
   a second haptic actuator disposed within the second housing structure; and
   at least one processor disposed within the first housing structure or the second housing structure, and operatively connected to the flexible display, the at least one sensor, the first haptic actuator, and the second haptic actuator, wherein the at least one processor is configured to:
   detect a folding state of the foldable housing using the at least one sensor, and
   independently control the first haptic actuator and the second haptic actuator based on at least part of the detected folding state,
   wherein when the electronic device is fully unfolded, the second haptic actuator is controlled to vibrate in a first phase, such that vibration outputs of the second housing structure is oriented in a first direction on the first housing structure, and
   wherein when the electronic device is fully folded, the second haptic actuator is controlled to vibrate in a second phase inversed from the first phase, such that the vibration outputs of the second housing structure remain oriented in the first direction on the first housing structure.

2. The electronic device of claim 1, wherein the at least one processor controls the second haptic actuator to output a phase-shifted vibration compared with the first haptic actuator in response to an operation in which the foldable housing is changed from the fully folded state to the fully unfolded state.

3. The electronic device of claim 1, wherein the at least one processor controls the first haptic actuator and the second haptic actuator by controlling a frequency, signal intensity, a signal phase, or whether to activate a signal.

4. The electronic device of claim 1, wherein the at least one sensor includes an angle sensor connected to the hinge structure so as to sense a position of the third face relative to the first face.

5. The electronic device of claim 1, wherein the at least one sensor includes a proximity sensor disposed in the first housing structure or the second housing structure.

6. The electronic device of claim 1, wherein the first haptic actuator and the second haptic actuator are spaced apart from each other with the hinge structure between the first haptic actuator and the second haptic actuator when the foldable housing is in the fully unfolded state, and
the first haptic actuator and the second haptic actuator face each other when the foldable housing is in the fully folded state.

7. An electronic device, comprising:
   a foldable housing including a hinge structure, a first housing structure connected to the hinge structure, and a second housing structure connected to the hinge structure, the second housing structure being configured to be rotatable about the hinge structure relative to the first housing structure;
   a flexible display disposed to extend from the first housing structure to the second housing structure;
   at least one sensor disposed within the foldable housing and configured to detect rotation of the second housing structure relative to the first housing structure;
   a first haptic actuator disposed within the first housing structure;
   a second haptic actuator disposed within the second housing structure;
   at least one processor disposed within the first housing structure or the second housing structure, and operatively connected to the display, the at least one sensor, the first haptic actuator, and the second haptic actuator; and a memory operatively connected to the at least one processor, wherein when the detected folding state is fully unfolded, the second haptic actuator is controlled to vibrate in a first phase, such that vibration outputs of the second housing structure is oriented in a first direction on the first housing structure, and wherein when a folding state of the foldable housing indicates that the electronic device is fully folded, the second haptic actuator is controlled to vibrate in a second phase inversed from the first phase, such that the vibration outputs of the second housing structure remain oriented in the first direction on the first housing structure.

8. The electronic device of claim 7, wherein the memory stores instructions that, when executed, cause the processor to perform control such that:

when a deviation of an angle formed by the first housing structure and the second housing structure from flat is within a threshold, the first haptic actuator receives a first haptic signal from the at least one processor and performs a first operation and the second haptic actuator receives a second haptic signal from the at least one processor and performs a second operation, and when the deviation exceeds the threshold, the first haptic actuator receives a third haptic signal from the processor and performs a third operation and the second haptic actuator receives a fourth haptic signal from the processor and performs a fourth operation, and the first haptic signal and the third haptic signal are the same.

9. The electronic device of claim 8, wherein the first haptic signal and the second haptic signal are the same, and the third haptic signal and the fourth haptic signal are opposite each other in phase.

10. The electronic device of claim 8, wherein the memory stores instructions that, when executed, cause the at least one processor to perform control such that:

the third haptic signal provides a signal having stronger intensity than the first haptic signal, and the fourth haptic signal provides a signal having stronger intensity than the second haptic signal, and wherein the third haptic signal and the fourth haptic signal are opposite each other in phase.

11. The electronic device of claim 8, wherein the memory stores instructions that, when executed, are configured to cause the processor to perform control such that, in an operation of changing the foldable housing from the fully folded state to the fully unfolded state, the second haptic signal provides a signal phase-shifted with respect to the first haptic signal in response to the rotation.

12. The electronic device of claim 7, wherein the flexible display includes an active area, which includes a first area corresponding to the first housing structure and a second area corresponding to the second housing structure, and the memory stores instructions that, when executed, are cause the at least one processor to differentially control the first haptic actuator and the second haptic actuator depending on presence/absence of a touch input in any one of the first area and the second area.

13. The electronic device of claim 7, wherein the flexible display includes an active area, which includes a first area corresponding to the first housing structure and a second area corresponding to the second housing structure, and the memory stores instructions that, when executed, are configured to cause the processor to differentially control the first haptic actuator and the second haptic actuator depending on a type of an application executed in any one of the first area and the second area.

14. The electronic device of claim 7, wherein the first haptic actuator and the second haptic actuator are configured to be spaced apart from each other with the hinge structure interposed therebetween when the foldable housing is in the fully unfolded state, and the first haptic actuator and the second haptic actuator are disposed to face each other when the foldable housing is in the fully folded state.

15. An electronic device comprising:

a foldable housing including:

a hinge structure, a first housing structure connected to the hinge structure, and including a first face and a second face opposite the first face, and a second housing structure connected to the hinge structure, and including a third face and a fourth face opposite the third face;

a first display positioned on the first face;

a second display positioned on the third face;

at least one sensor disposed within the foldable housing, and configured to detect a fully folded state of the foldable housing;

a first haptic actuator disposed within the first housing structure;

a second haptic actuator disposed within the first housing structure;

at least one processor disposed within the first housing structure or the second housing structure, and operatively connected to the display, the at least one sensor, the first haptic actuator, and the second haptic actuator; and a memory operatively connected to the processor, wherein the memory stores instructions that, when executed, cause the at least one processor to detect the folding state of the foldable housing using the at least one sensor, and to independently control the first haptic actuator and the second haptic actuator based on at least part of the detected fully folded state, wherein when the detected folding state of the foldable housing indicates that the electronic device is fully unfolded, the second haptic actuator is controlled to vibrate in a first phase, such that vibration outputs of the second housing structure is oriented in a first direction on the first housing structure, and wherein when the detected folding state of the foldable housing indicates that the electronic device is fully folded, the second haptic actuator is controlled to vibrate in a second phase inversed from the first phase, such that the vibration outputs of the second housing structure remain oriented in the first direction on the first housing structure.

16. The electronic device of claim 15, wherein the instructions cause the at least one processor to differently control the first haptic actuator and the second haptic actuator when the foldable housing is not in the fully unfolded state.

17. The electronic device of claim 7, wherein the memory stores instructions that, when executed, cause the processor to perform control such that:

when a deviation of an angle formed by the first housing structure and the second housing structure from flat is within a threshold, the first haptic actuator receives a first haptic signal from the at least one processor and performs a first operation and the second haptic actuator receives a second haptic signal from the at least one processor and performs a second operation, and when the deviation exceeds the threshold, the first haptic actuator receives a third haptic signal from the processor and performs a third operation and the second haptic actuator receives a fourth haptic signal from the processor and performs a fourth operation, and wherein the first haptic signal provides a signal having stronger intensity than the third haptic signal, or the second haptic signal provides a signal having stronger intensity than the fourth haptic signal.

* * * * *